US010739274B2

(12) United States Patent
Nonaka

(10) Patent No.: US 10,739,274 B2
(45) Date of Patent: Aug. 11, 2020

(54) IMAGING SUPPORT DEVICE AND IMAGING SUPPORT METHOD

(71) Applicant: FUJIFILM Corporation, Tokyo (JP)

(72) Inventor: Shunichiro Nonaka, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 140 days.

(21) Appl. No.: 16/015,267

(22) Filed: Jun. 22, 2018

(65) Prior Publication Data
US 2018/0299387 A1    Oct. 18, 2018

Related U.S. Application Data

(63) Continuation of application No. PCT/JP2017/000503, filed on Jan. 10, 2017.

(30) Foreign Application Priority Data

Jan. 22, 2016 (JP) ................... 2016-010710

(51) Int. Cl.
*G01N 21/88* (2006.01)
*G03B 15/00* (2006.01)
(Continued)

(52) U.S. Cl.
CPC ...... *G01N 21/8851* (2013.01); *G01M 5/0033* (2013.01); *G01M 5/0091* (2013.01);
(Continued)

(58) Field of Classification Search
CPC .......... G01N 21/8851; G01N 21/9515; G01N 21/8806; G03B 17/561; G03B 15/00;
(Continued)

(56) References Cited

U.S. PATENT DOCUMENTS 7,016,549 B1 * 3/2006 Utagawa ............... G06T 3/4015
382/260
8,743,232 B2 * 6/2014 Onishi ................. H04N 5/2628
348/222.1
(Continued)

FOREIGN PATENT DOCUMENTS

CN    101390383 A    3/2009
CN    102201114 A    9/2011
(Continued)

OTHER PUBLICATIONS

The extended European search report issued by the European Patent Office on Jan. 11, 2019, which corresponds to European Patent Application No. 17741248.3 and is related to U.S. Appl. No. 16/015,267.

(Continued)

*Primary Examiner* — James M Pontius
(74) *Attorney, Agent, or Firm* — Studebaker & Brackett PC

(57) ABSTRACT

The imaging support device includes: a distance information-acquisition unit (20) that acquires distance information on a distance between an imaging device (200) and the surface to be imaged of a structure; an inclination angle information-acquisition unit (22) that acquires inclination angle information on an inclination angle of the surface to be imaged of the structure; an actual pixel density-calculation unit (24) that calculates actual pixel density of the surface to be imaged of the structure on the basis of imaging performance information of the imaging device (200) (including information on the number of pixels of an imaging element, size information of the imaging element, and information on a focal length), distance information, and inclination angle information; and a pixel density-determination unit (26) that (Continued)

determines whether or not the calculated actual pixel density matches required pixel density information.

13 Claims, 16 Drawing Sheets

(51) Int. Cl.
| | |
|---|---|
| *G01M 5/00* | (2006.01) |
| *H04N 7/18* | (2006.01) |
| *H04N 5/232* | (2006.01) |
| *G03B 17/56* | (2006.01) |
| *G01N 21/95* | (2006.01) |
| *G06T 7/80* | (2017.01) |
| *G06T 7/50* | (2017.01) |
| *G06T 7/70* | (2017.01) |
| *G06T 7/00* | (2017.01) |
| *G01C 9/00* | (2006.01) |

(52) U.S. Cl.
CPC ..... *G01N 21/8806* (2013.01); *G01N 21/9515* (2013.01); *G03B 15/00* (2013.01); *G03B 17/561* (2013.01); *G06T 7/0002* (2013.01); *G06T 7/50* (2017.01); *G06T 7/70* (2017.01); *G06T 7/80* (2017.01); *H04N 5/23222* (2013.01); *H04N 5/23296* (2013.01); *H04N 5/23299* (2018.08); *H04N 7/18* (2013.01); *G01C 9/00* (2013.01); *G06T 2207/30168* (2013.01); *G06T 2207/30184* (2013.01)

(58) Field of Classification Search
CPC .. H04N 5/23299; H04N 7/18; H04N 5/23296; H04N 5/23222; G01M 5/0091; G01M 5/0033; G06T 7/0002; G06T 7/70; G06T 7/50; G06T 7/80; G06T 2207/30184; G06T 2207/30168; G01C 9/00
See application file for complete search history.

(56) References Cited

U.S. PATENT DOCUMENTS

| | | | |
|---|---|---|---|
| 2010/0007751 A1 | 1/2010 | Icho et al. | |
| 2012/0056873 A1* | 3/2012 | Kim | G06T 7/50 345/419 |
| 2012/0147206 A1 | 6/2012 | Onishi | |
| 2012/0243785 A1* | 9/2012 | Yu | G06K 9/3241 382/173 |
| 2014/0300722 A1* | 10/2014 | Garcia | G01B 11/02 348/77 |
| 2015/0305607 A1 | 10/2015 | Morita | |
| 2015/0379554 A1* | 12/2015 | Copeland | G06Q 30/0239 705/14.39 |
| 2017/0345402 A1* | 11/2017 | Zhou | G06T 7/11 |
| 2018/0165541 A1* | 6/2018 | Amico | G06K 9/6212 |
| 2019/0087942 A1* | 3/2019 | Ma | G06K 9/4671 |
| 2019/0340782 A1* | 11/2019 | Sinha | H04N 5/23299 |

FOREIGN PATENT DOCUMENTS

| | | |
|---|---|---|
| CN | 102692347 A | 9/2012 |
| JP | H05-334480 A | 12/1993 |
| JP | 2003-015218 A | 1/2003 |
| JP | 2006-309742 A | 11/2006 |
| JP | 2007-280282 A | 10/2007 |
| JP | 2009-085785 A | 4/2009 |
| JP | 2010-216829 A | 9/2010 |
| JP | 2012-129754 A | 7/2012 |

OTHER PUBLICATIONS

International Search Report issued in PCT/JP2017/000503; dated Mar. 7, 2017.
International Preliminary Report on Patentability and Written Opinion issued in PCT/JP2017/000503; dated Jul. 24, 2018.
An Office Action mailed by the State Intellectual Property Office of the People's Republic of China on Dec. 19, 2019, which corresponds to Chinese Patent Application No. 201780006368.0 and is related to U.S. Appl. No. 16/015,267 with English language translation.

* cited by examiner

IMAGING SUPPORT DEVICE AND IMAGING SUPPORT METHOD

CROSS-REFERENCE TO RELATED APPLICATIONS

The present application is a Continuation of PCT International Application No. PCT/JP2017/000503 filed on Jan. 10, 2017 claiming priority under 35 U.S.C. § 119(a) to Japanese Patent Application No. 2016-10710 filed on Jan. 22, 2016. Each of the above applications is hereby expressly incorporated by reference, in their entirety, into the present application.

BACKGROUND OF THE INVENTION

1. Field of the Invention

The present invention relates to an imaging support device and an imaging support method that support the imaging of a structure performed using an imaging device.

2. Description of the Related Art

There are various structures, such as a bridge, a road, a tunnel, a dam, and a building, as social infrastructure. Since damage is generated in these structures and the damage is predisposed to progress with the lapse of time, the structures need to be inspected at a predetermined frequency.

Further, various supporting technologies using a computer device are known.

JP2007-280282A discloses a technology that receives global positioning system (GPS) radio waves by a portable terminal to calculate the position information of the portable terminal and determines whether or not the position information of the portable terminal is present in a predetermined range to check whether or not structures positioned near the portable terminal are structures to be inspected.

JP2009-85785A discloses a technology that calculates the inclination angle of a wall surface with respect to the optical axis of an imaging device on the basis of a distance to the wall surface, which is detected by a pair of left and right distance sensors, and the pan angle and the tilt angle of the imaging device (camera), and makes the inclination angle be in an allowable range in the measurement of the width of a crack of the wall surface.

JP2006-309742A discloses a technology that determines whether or not a resolution is a resolution required to specify a vehicle number or a driver on the basis of the number of imaging pixels, the angle of view of an optical system, and a distance to a subject.

SUMMARY OF THE INVENTION

There is a case where it is difficult to reliably acquire an image satisfying required image quality by an imaging device due to the imaging condition of a structure or the structure of a structure. For example, an imaging plan for imaging the surface to be imaged of a structure in a state in which an imaging device faces the surface to be imaged in a direction perpendicular to the surface to be imaged and acquiring an image satisfying required image quality is made. However, actually, in a case where it is not possible to image the surface to be imaged of the structure in a state in which the imaging device faces the surface to be imaged in a direction perpendicular to the surface to be imaged and it is also not possible to reliably recognize whether or not the image satisfies required image quality, it is difficult to reliably acquire an image satisfying required image quality.

Since a crack having a narrow width (for example, 0.1 mm) needs to be capable of being recognized in the inspection of a crack of a concrete member, the crack needs to be imaged with high image quality so as to be sufficiently recognized. Even in the inspection of a crevice of a steel member, the crevice needs to be imaged with high image quality so as to be sufficiently recognized. In a case where it is found that an image is taken with low image quality not allowing damage, such as a crack and a crevice, to be sufficiently recognized, an image needs to be taken again. Further, in a case where it is ignored that an image has been taken with low image quality not allowing damage to be sufficiently recognized, there is a possibility that inappropriate inspection results may be reported. For example, there are a possibility that a crack, which is narrow but critical, may be ignored and a possibility that a large crack may be evaluated as a narrow crack.

JP2007-280282A discloses a technology that checks whether or not structures positioned near the portable terminal are structures to be inspected on the basis of the position information of the portable terminal obtained using GPS, but does not disclose a technology that determines whether or not an image satisfies required image quality to reliably acquire an image satisfying the required image quality.

JP2009-85785A merely discloses a technology that makes the inclination angle of a wall surface with respect to the optical axis of the imaging device be in an allowable range, that is, a technology that images a wall surface as the surface to be imaged of the structure in a state in which the imaging device faces the wall surface in a direction perpendicular to the wall surface so that a wall surface satisfying required image quality can be taken. In a case in which an image cannot be taken in a state in which the imaging device faces the surface to be imaged of the structure in a direction perpendicular to the surface to be imaged, the image quality (detection accuracy) of a crack deteriorates.

Since an imaging device is disposed so as to face a license plate or a driver's face in a direction perpendicular to the license plate or the driver's face in JP2006-309742A, there is a possibility that a vehicle number or a driver cannot be specified in a case in which the imaging device takes an image in a state in which the imaging device does not face the license plate or the driver's face in a direction perpendicular to the license plate or the driver's face.

The invention has been made in consideration of the above-mentioned circumstances, and an object of the invention is to provide an imaging support device and an imaging support method that allow an image, which satisfies required image quality, to be reliably acquired by reliably recognizing whether or not an image satisfies required image quality even in a case in which an image cannot be taken in a state in which an imaging device faces the surface to be imaged of a structure in a direction perpendicular to the surface to be imaged.

In order to achieve the above-mentioned object, an imaging support device according to a first aspect of the invention supports imaging of a structure performed using an imaging device and comprises: a required pixel density information-acquisition unit that acquires required pixel density information of a surface to be imaged of the structure required for recognition of a damage state of the structure; an imaging performance information-acquisition unit that acquires imaging performance information of the imaging device including information on the number of pixels of an imaging element of the imaging device, size information of the imaging element of the imaging device, and information on a focal length of an imaging lens of the imaging device; a distance information-acquisition unit that acquires distance information on a distance between the imaging device and the surface to be imaged of the structure; an inclination angle information-acquisition unit that acquires inclination angle information on an inclination angle of the surface to be imaged of the structure with respect to a direction orthogonal to an imaging direction of the imaging device; an actual pixel density-calculation unit that calculates actual pixel density of the surface to be imaged of the structure on the basis of the acquired imaging performance information, the acquired distance information, and the acquired inclination angle information; and a pixel density-determination unit that determines whether or not the calculated actual pixel density matches the required pixel density information.

According to this aspect, the actual pixel density of the surface to be imaged of the structure is calculated on the basis of the imaging performance information of the imaging device, the distance information on a distance between the imaging device and the surface to be imaged of the structure, and the inclination angle information on an inclination angle of the surface to be imaged of the structure; and it is determined whether or not the actual pixel density matches the required pixel density information. Accordingly, it is possible to reliably recognize whether or not an image satisfies required image quality even in a case in which an image cannot be taken in a state in which the imaging device faces the surface to be imaged of the structure in a direction perpendicular to the surface to be imaged. Accordingly, it is possible to reliably acquire an image satisfying the required image quality.

In an imaging support device according to a second aspect of the invention, the actual pixel density-calculation unit calculates the actual pixel density, which is to be obtained in a case in which the inclination angle information is an angle θ larger than 0°, by multiplying the actual pixel density, which is to be obtained in a case in which the inclination angle information is 0°, and cos θ together. According to this aspect, it is possible to easily calculate actual pixel density, which is to be obtained in a case in which an image is taken in a state in which the imaging device faces the surface to be imaged of the structure in a direction not perpendicular to the surface to be imaged, on the basis of actual pixel density that is to be obtained in a case in which an image is taken in a state in which the imaging device faces the surface to be imaged of the structure in a direction perpendicular to the surface to be imaged. Accordingly, it is possible to easily determine whether or not an image satisfies required image quality.

An imaging support device according to a third aspect of the invention further comprises a requirement matching range-determination unit that determines a requirement matching range, in which the actual pixel density matches the required pixel density information, in an imageable range of the surface to be imaged of the structure corresponding to an angle of view of the imaging device. According to this aspect, it is possible to easily recognize a requirement matching range, in which the actual pixel density matches the required pixel density information, in an imageable range of the surface to be imaged of the structure corresponding to an angle of view of the imaging device.

In an imaging support device according to a fourth aspect of the invention, the required pixel density information-acquisition unit acquires the required pixel density information on the basis of at least one of the type of a member of the structure or the type of damage to the structure.

An imaging support device according to a fifth aspect of the invention further comprises an output unit that outputs results of the determination.

In an imaging support device according to a sixth aspect of the invention, the output unit outputs information prompting the imaging device to move in a case where it is determined that the actual pixel density does not match the required pixel density information.

An imaging support device according to a seventh aspect of the invention further comprises: an imaging control computing unit that computes an imaging position and an imaging direction of the imaging device, which allow the actual pixel density to match the required pixel density information, on the basis of a current imaging position and a current imaging direction of the imaging device in a case where it is determined that the actual pixel density does not match the required pixel density information; and an imaging control unit that controls the imaging position and the imaging direction of the imaging device on the basis of computation results of the imaging control computing unit.

In an imaging support device according to an eighth aspect of the invention, before a plurality of times of imaging of the structure is performed, the pixel density-determination unit determines whether or not the actual pixel density satisfies the required pixel density information over the plurality of times of imaging while using pixel density, which is obtained from the surface to be imaged of the structure at each imaging of the structure, as the actual pixel density information.

In an imaging support device according to a ninth aspect of the invention, the pixel density-determination unit switches the required pixel density information, which is to be compared with the actual pixel density, according to the type of the imaging device or the type of an apparatus on which the imaging device is mounted.

An imaging support device according to a tenth aspect of the invention further comprises: a drawing information-acquisition unit that acquires drawing information of the structure; an imaging point specification unit that specifies an imaging point of the structure on the basis of the acquired drawing information; and an imaging planning unit that determines an imaging position and an imaging direction of each imaging of the structure on the basis of the specified imaging point of the structure, and generates imaging plan information representing the imaging position and the imaging direction of each imaging of the structure.

In an imaging support device according to an eleventh aspect of the invention, the structure includes at least one of a concrete member or a steel member as a member to be inspected.

In an imaging support device according to a twelfth aspect of the invention, the structure includes a member in which at least one of a crack or a crevice is generated as damage to be recognized.

An imaging support method of the invention supports imaging of a structure performed using an imaging device and comprises: a step of acquiring required pixel density information of a surface to be imaged of the structure required for recognition of a damage state of the structure; a step of acquiring imaging performance information of the imaging device including information on the number of pixels of an imaging element of the imaging device, size information of the imaging element of the imaging device, and information on a focal length of an imaging lens of the imaging device; a step of acquiring distance information on a distance between the imaging device and the surface to be imaged of the structure; a step of acquiring inclination angle information on an inclination angle of the surface to be imaged of the structure with respect to a direction orthogonal to an imaging direction of the imaging device; a step of calculating actual pixel density of the surface to be imaged of the structure on the basis of the acquired imaging performance information, the acquired distance information, and the acquired inclination angle information; and a step of determining whether or not the calculated actual pixel density matches the required pixel density information.

According to the invention, since it is possible to reliably recognize whether or not an image satisfies required image quality even in a case in which an image cannot be taken in a state in which the imaging device faces the surface to be imaged of the structure in a direction perpendicular to the surface to be imaged, it is possible to reliably acquire an image satisfying the required image quality.

DESCRIPTION OF THE PREFERRED EMBODIMENTS

Embodiments of an imaging support device and an imaging support method according to the invention will be described below with reference to accompanying drawings.

First Embodiment

Figure 1:
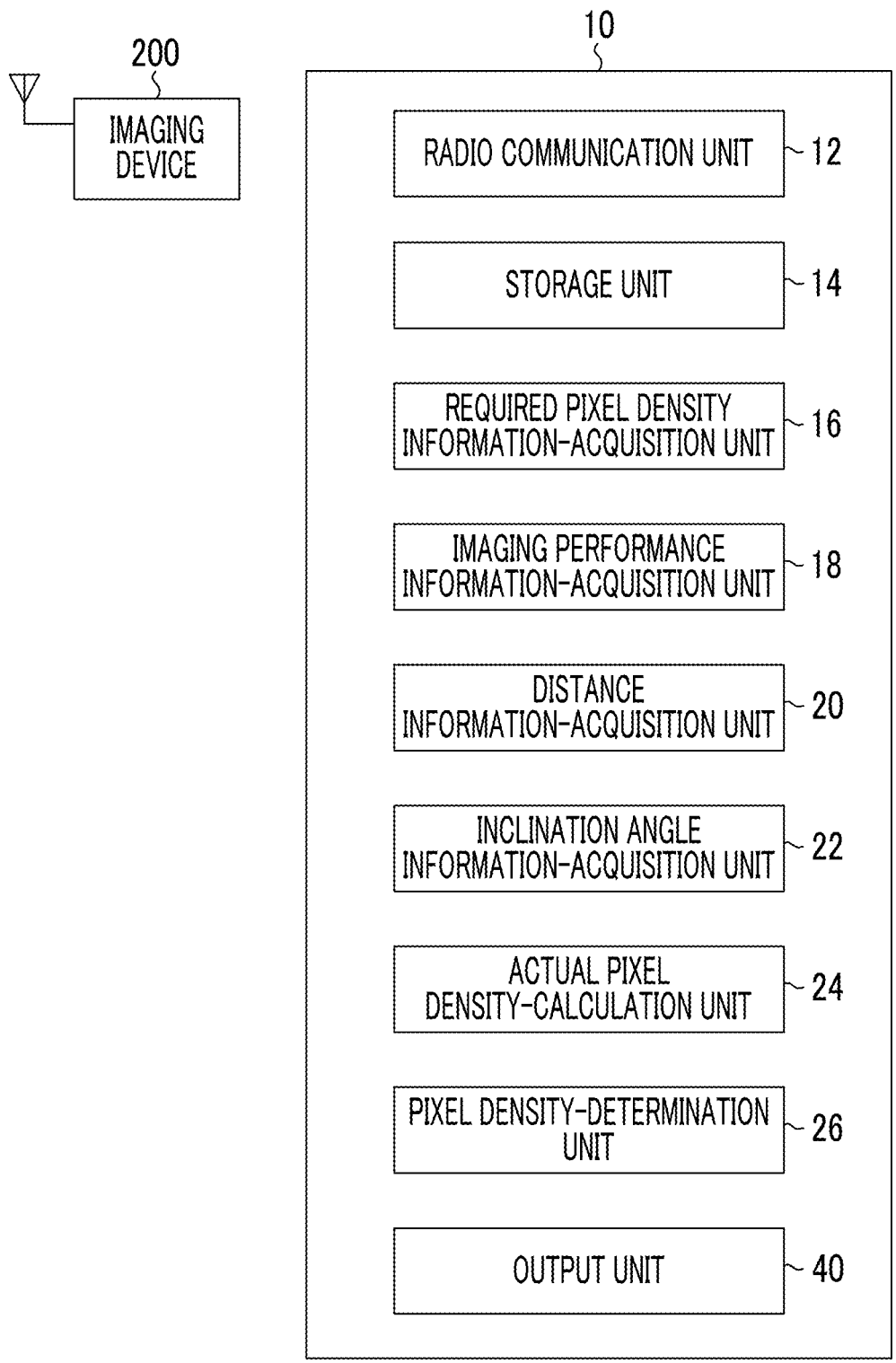
FIG. 1 is a block diagram showing an example of the configuration of an imaging support device according to a first embodiment.

FIG. 1 is a block diagram showing an example of the configuration of an imaging support device according to a first embodiment.

The imaging support device 10 includes: a radio communication unit 12 that communicates with an imaging device 200 by radio; a storage unit 14 that stores the required pixel density information of the surface to be imaged of a structure, which is required for the recognition of the damage state of the structure, and the imaging performance information of the imaging device 200; a required pixel density information-acquisition unit 16 that acquires the required pixel density information from the storage unit 14; an imaging performance information-acquisition unit 18 that acquires the imaging performance information of the imaging device 200, which is used to image the structure, from the storage unit 14; a distance information-acquisition unit 20 that acquires distance information, which represents a distance between the imaging device 200 and the surface to be imaged of the structure (hereinafter, referred to as an imaging distance); an inclination angle information-acquisition unit 22 that acquires inclination angle information on the inclination angle of the surface to be imaged of the structure with respect to a direction orthogonal to an imaging direction of the imaging device 200; an actual pixel density-calculation unit 24 that calculates the actual pixel density of the surface to be imaged of the structure on the basis of the acquired imaging performance information, the acquired distance information, and the acquired inclination angle information; a pixel density-determination unit 26 that determines whether or not the calculated actual pixel density matches the required pixel density information; and an output unit 40 that outputs the result of the determination of the pixel density-determination unit 26. The imaging device 200 includes an imaging element and an imaging lens.

The radio communication unit 12 is formed of a radio communication device that communicates with the imaging device 200 by radio.

The storage unit 14 is a storage device that is provided in the imaging support device 10, and includes a read only memory (ROM), a random access memory (RAM), and an electrically erasable programmable read only memory (EEPROM). Other storage devices may be used.

The required pixel density information and the imaging performance information are stored in the storage unit 14 of the imaging support device 10 in this embodiment, but the required pixel density information and the imaging performance information are stored in a storage device provided outside the imaging support device 10 and the required pixel density information and the imaging performance information may be acquired from the storage device provided outside the imaging support device 10.

The required pixel density information is information that represents pixel density required for the surface to be imaged of the structure in a taken image (hereinafter, referred to as "required pixel density"). The "required pixel density" of this embodiment is the number of pixels per unit length of the surface to be imaged in a taken image. The "required pixel density" of this example may be expressed by the number of pixels per unit area. The required pixel density information may be expressed by an inverse number of the required pixel density (required resolution). Even in the case of a concrete member, the required pixel density information varies depending on the type of the concrete member. For example, the required pixel density information of a reinforced concrete (RC) material is 1.0 [mm/pixel] and the required pixel density information of a pre-stressed concrete (PC) material is 0.5 [mm/pixel]. In this embodiment, a PC material is used and a crack having a width of 0.1 mm needs to be checked. For this reason, a resolution of 0.5 [mm/pixel] or less corresponding to five times the width of a crack is required. The required pixel density information also varies depending on the type of damage.

The required pixel density information-acquisition unit 16 acquires the required pixel density information on the basis of at least one of the type of a member of the structure or the type of damage to the structure.

The imaging performance information, which is acquired by the imaging performance information-acquisition unit 28, includes information on the number of pixels of the imaging element of the imaging device 200, size information of the imaging element of the imaging device 200, and information on the focal length of the imaging lens of the imaging device 200. The information on the number of pixels is information corresponding to the number of pixels of the imaging element of the imaging device 200 (hereinafter, referred to as "the number of pixels of the imaging element"), and is not limited to information that is expressed by the number of pixels itself. The size information is information corresponding to the size of the imaging element of the imaging device 200 (hereinafter, referred to as "the size of the imaging element"), and is not limited to information that is expressed by the physical quantity of a size. The information on the focal length is information corresponding to the focal length of the imaging lens of the imaging device 200, and is not limited to information that is expressed by a focal length itself. For example, the size information may be identification information, such as "full size". For example, a case in which the imaging performance information is expressed by the angle of view and the number of pixels of the imaging element, which are determined depending on a focal length and the size of the imaging element, is also included in the invention.

The distance information-acquisition unit 20 can acquire distance information by various methods. First, there is an aspect where the imaging device 200 includes two lenses and distance information is acquired through stereo measurement. Second, there is an aspect where the imaging device 200 is further provided with a range finder. The distance information may be acquired by a time of flight (TOF) method. The distance information may be acquired by other methods.

An aspect where inclination angle information is acquired by the inclination angle information-acquisition unit 22 may be any one of an aspect where the inclination angle information is directly acquired and an aspect where the inclination angle information is calculated. The inclination angle information-acquisition unit 22 of this embodiment calculates the inclination angle information from the imaging distances of two or more points on the surface to be imaged. The inclination angle information may be acquired by other methods. The inclination angle information is information that represents the inclination of the surface to be imaged with respect to a direction orthogonal to the imaging direction (hereinafter, simply referred to as an "orthogonal direction"), that is, information that represents the inclination of the surface to be imaged with respect to an orthogonal plane orthogonal to the imaging direction. The inclination angle information is expressed by an inclination angle with respect to a direction orthogonal to the imaging direction in this embodiment, but the invention is not limited thereto. For example, the inclination angle information may be expressed by an angle with respect to the imaging direction. In short, any information, which can be converted into the inclination angle of the surface to be imaged, may be used as the inclination angle information.

Details of the actual pixel density-calculation unit 24 will be described later. The actual pixel density-calculation unit 24 is means for calculating information that represents the pixel density of the surface to be imaged in an actually taken image, is not limited to means for calculating pixel density itself, and includes means for calculating resolution. The actual pixel density-calculation unit 24 may calculate pixel density per unit length (or unit area) on an imaging plane of the imaging element of the imaging device 200. Further, there are a case where the information representing pixel density is calculated before imaging and a case where the information representing pixel density is calculated after imaging.

The pixel density-determination unit 26 switches required pixel density information, which is to be compared with the actual pixel density, according to the type of the imaging device 200 or the type of an apparatus on which the imaging device 200 is mounted. For example, since actual pixel density to be obtained in a case in which an image is taken in the air by a drone (flying device) is lower than actual pixel density to be obtained in a case in which a dedicated digital camera is fixed as the imaging device 200 and takes an image, the pixel density-determination unit 26 switches the required pixel density information, which is to be compared with the actual pixel density, according to the type of the imaging device 200 or the type of an apparatus on which the imaging device 200 is mounted.

The output unit 40 can be formed of various devices.

In a case in which the output unit 40 is formed of a display device, the result of the determination is displayed on the display device.

In a case in which the output unit 40 is formed of a recording medium-interface device that records information on a recording medium (for example, memory card), the recording medium-interface device records the result of the determination on a recording medium. For example, the recording medium-interface device records the result of the determination as tag information that is the additional information of a taken image. In this case, it is preferable that the recording medium-interface device records the result of the determination regardless of whether or not the actual pixel density matches the required pixel density information.

The output unit 40 can also be formed of the radio communication unit 12, and may transmit the result of the determination to an external device (for example, an imaging device or a device on which the imaging device is mounted) through radio communication.

Further, the output unit 40 of this embodiment outputs information prompting the imaging device 200 to move in a case where it is determined that the actual pixel density does not match the required pixel density information. For example, the output unit 40 displays an instruction to move the imaging device 200 from the current position to a position closer to the surface to be imaged of the structure (for example, an instruction of "please come close up to XX [cm] from the surface to be imaged and image the surface to be imaged").

Figure 2:
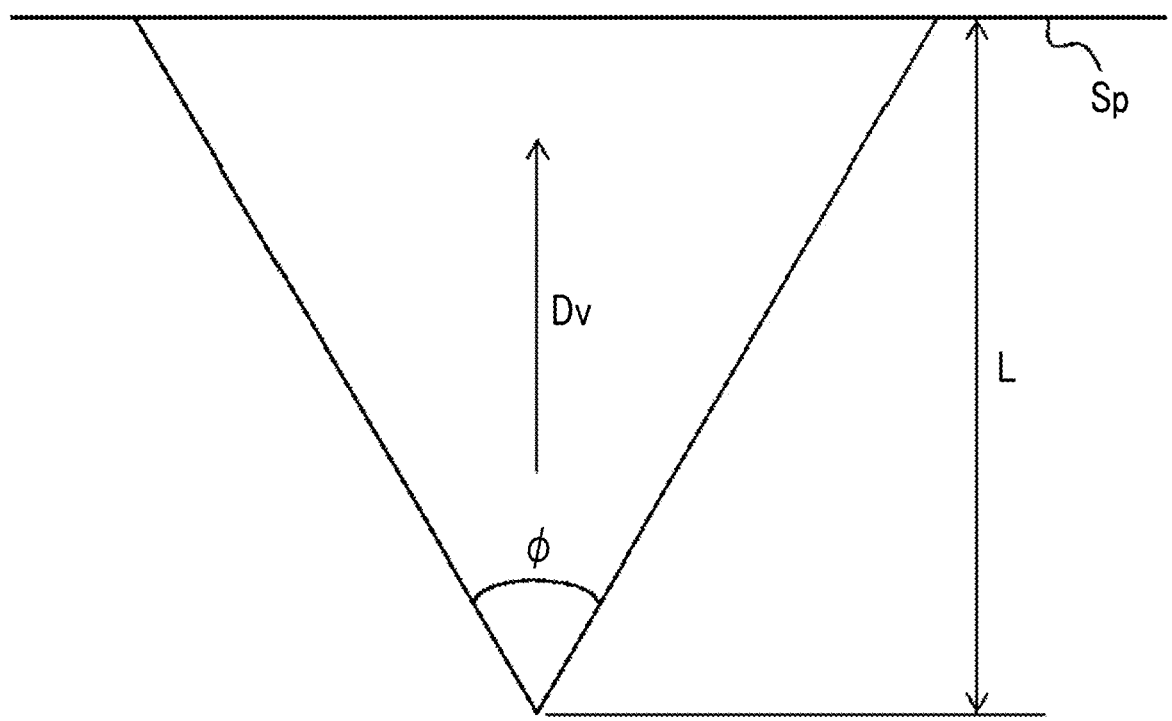
FIG. 2 is a diagram showing a relationship among an angle of view, an imaging distance, and a surface to be imaged in a case in which the surface to be imaged is imaged in a direction orthogonal to the surface to be imaged.

FIG. 2 shows a relationship among an angle φ of view, an imaging distance L, and the surface Sp to be imaged in a case in which the surface to be imaged is imaged in a direction Dv orthogonal to the surface to be imaged. The angle φ of view can be obtained from the size and the focal length of the imaging element of the imaging device 200 by the following equation 1. In Equation 1, "arctan" is the inverse function of a tangent function.

Angle φ of view=2×arctan(size of imaging element [mm]/(2×focal length [mm]))  [Equation 1]

In a case in which the surface Sp to be imaged is imaged in the imaging direction Dv orthogonal to the surface Sp to be imaged as shown in FIG. 2, resolution per pixel (the inverse number of pixel density) can be obtained using the imaging distance L by the following equation 2. In Equation 2, "tan" is a tangent function.

Resolution [mm/pixel]=2×imaging distance L [mm]× tan(angle φ of view/2)/the number of pixels of imaging element  [Equation 2]

Figure 3:
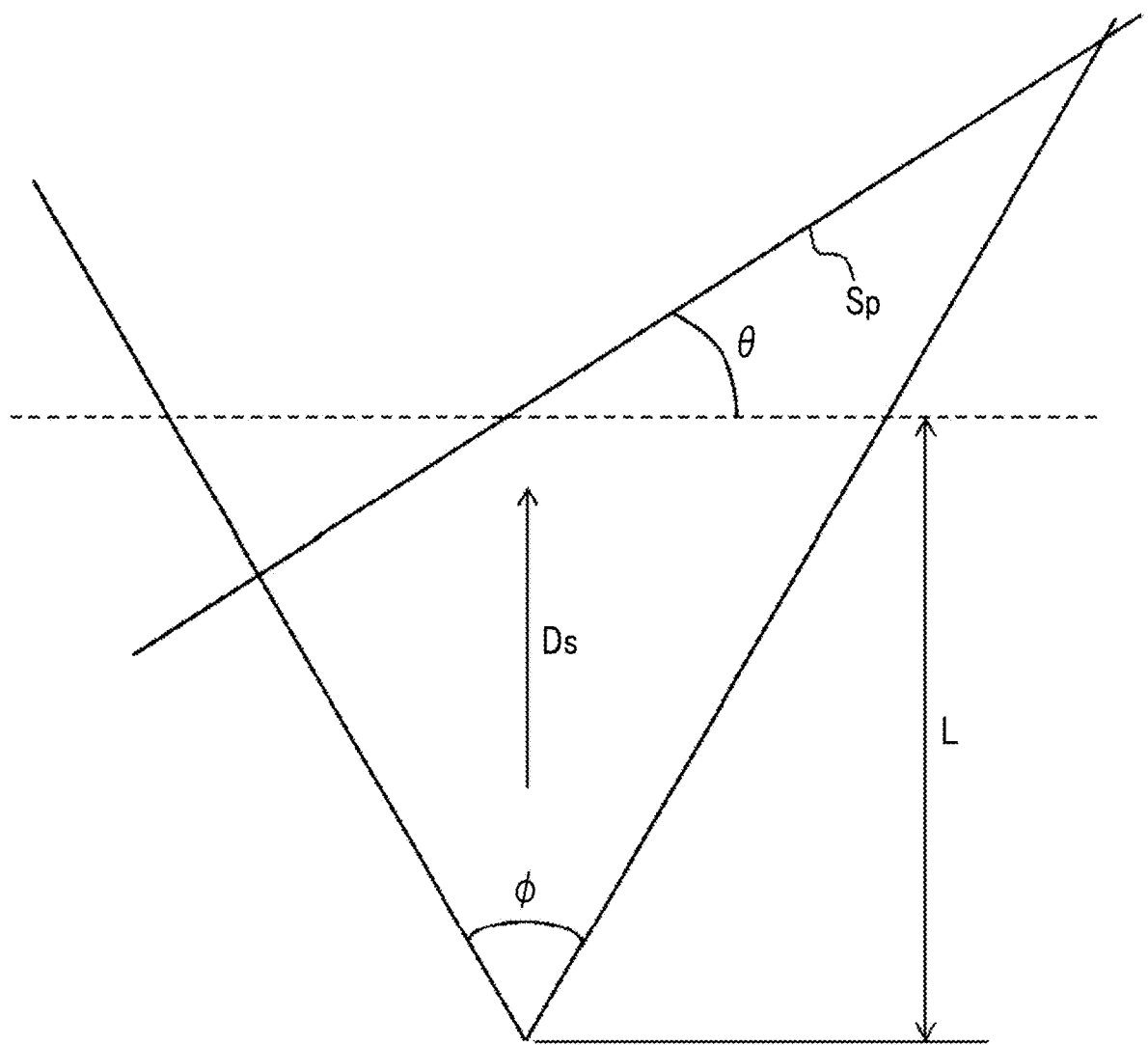
FIG. 3 is a diagram showing a relationship among the angle of view, an imaging distance, and the surface to be imaged in a case in which the surface to be imaged is imaged in a direction not orthogonal to the surface to be imaged.

In a case in which the surface Sp to be imaged is imaged in a direction Ds not orthogonal to the surface Sp to be imaged as shown in FIG. 3, resolution per pixel (the inverse number of pixel density) can be obtained using the imaging distance L and an inclination angle θ of the surface Sp to be imaged by the following equation 3.

Resolution [mm/pixel]=(2×imaging distance L×tan (angle φ of view/2)/the umber of pixels of imaging element)/cos θ  [Equation 3]

As described using Equations 1 to 3, the actual pixel density can be calculated on the basis of the number of pixels of the imaging element, the size of the imaging element, the focal length, the imaging distance L, and the inclination angle θ.

Further, as described Equations 2 and 3, pixel density, which is to be obtained in a case in which the inclination angle is larger than 0° (in a case in which the surface Sp to be imaged is imaged in a direction not orthogonal to the surface Sp to be imaged as shown in FIG. 3), can be calculated by multiplying pixel density, which is to be obtained in a case in which the inclination angle is 0° (in a case in which the surface Sp to be imaged is imaged in a direction orthogonal to the surface Sp to be imaged as shown in FIG. 2), (hereinafter, referred to as "reference pixel density") and cos θ together. Resolution (the inverse number of pixel density) may be calculated, and resolution, which is to be obtained in a case in which the inclination angle is larger than 0°, can be calculated by multiplying resolution, which is to be obtained in a case in which the inclination angle θ is 0°, and (1/cos θ) together. Calculation using the resolution is also included in the invention.

Figure 4:
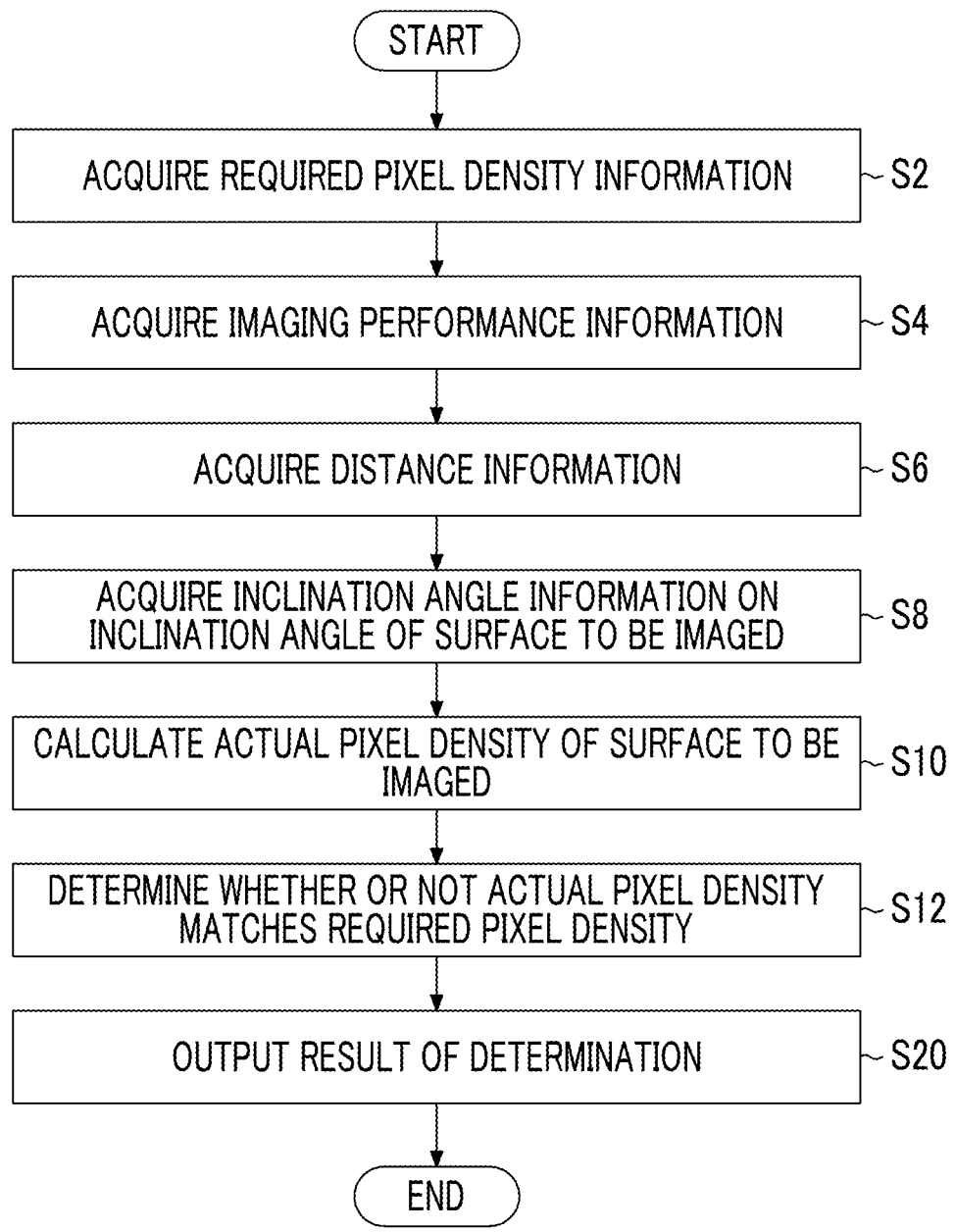
FIG. 4 is a flowchart showing the flow of an example of processing of an imaging support method according to the first embodiment.

FIG. 4 is a flowchart showing the flow of an example of imaging support processing of the first embodiment. This processing is performed according to a program stored in the storage unit 14.

The required pixel density information and the imaging performance information are stored in the storage unit 14 in advance.

First, the required pixel density information is acquired from the storage unit 14 by the required pixel density information-acquisition unit 16 (Step S2).

Next, the imaging performance information is acquired from the storage unit 14 on the basis of at least one of the type of a member of the structure or the type of damage to the structure by the imaging performance information-acquisition unit 18 (Step S4).

Then, the distance information on a distance between the imaging device 200 and the surface to be imaged is acquired by the distance information-acquisition unit 20 (Step S6).

Next, the inclination angle information on the inclination angle of the surface to be imaged with respect to a direction orthogonal to the imaging direction of the imaging device 200 is acquired by the inclination angle information-acquisition unit 22 (Step S8).

Then, the actual pixel density of the surface to be imaged of the structure in a taken image is calculated on the basis of the imaging performance information, the distance information, and the inclination angle information by the actual pixel density-calculation unit 24 (Step S10).

Next, the pixel density-determination unit 26 determines whether or not the calculated actual pixel density matches the required pixel density information (Step S12). For example, the pixel density-determination unit 26 determines whether or not the actual pixel density has a value required for the recognition of cracks or crevices.

Then, the result of the determination of the pixel density-determination unit 26 is output by the output unit 40 (Step S20). It is preferable that the output unit 40 displays information prompting the imaging device 200 to move in a case where it is determined that the actual pixel density does not match the required pixel density information.

Second Embodiment

Figure 5:
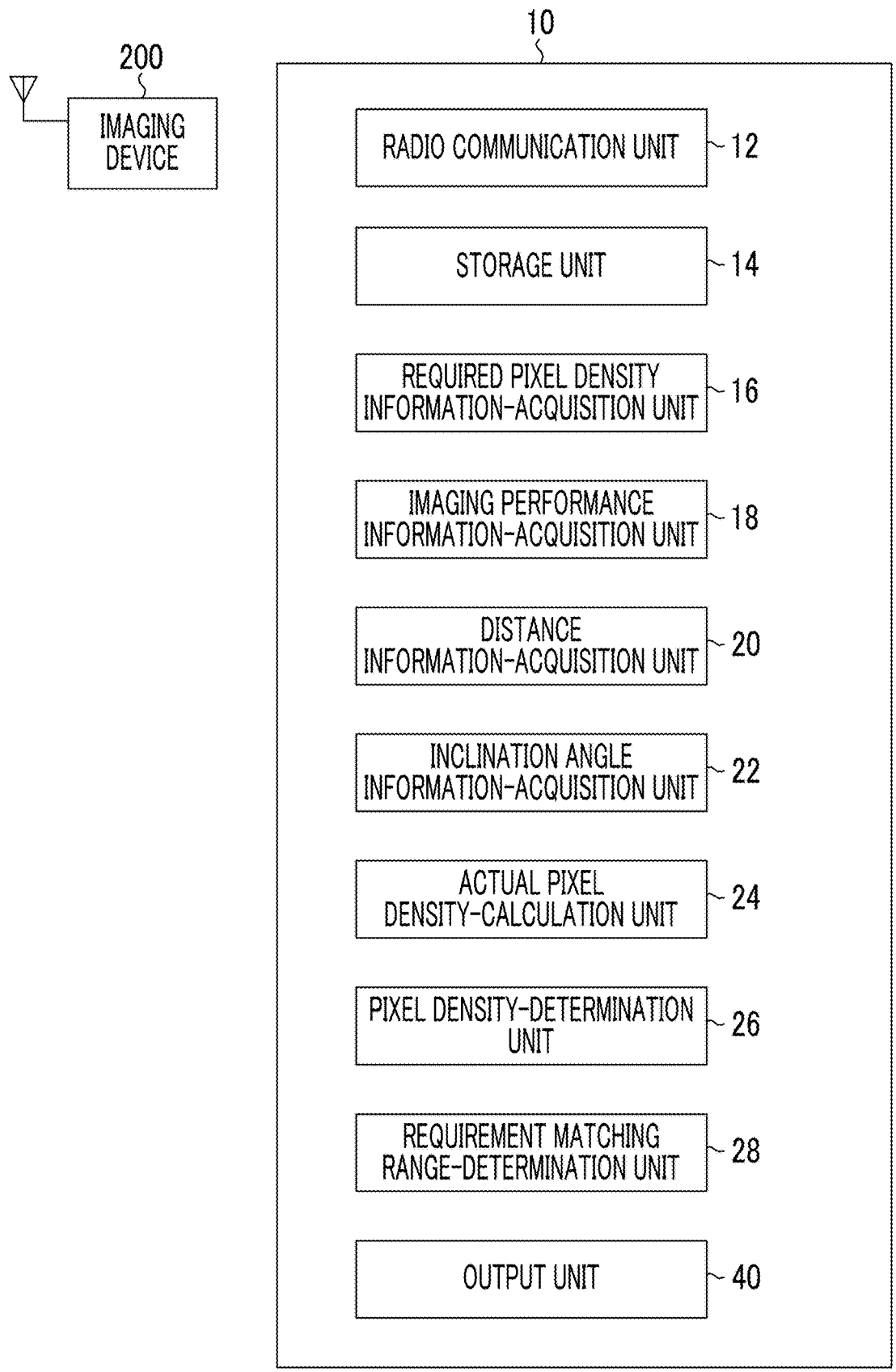
FIG. 5 is a block diagram showing an example of the configuration of an imaging support device according to a second embodiment.

FIG. 5 is a block diagram showing an example of the configuration of an imaging support device according to a second embodiment. The same components as the components of the imaging support device of the first embodiment shown in FIG. 1 are denoted in FIG. 5 by the same reference numerals as the reference numerals of the components of the imaging support device of the first embodiment shown in FIG. 1, and the description thereof will be omitted.

The imaging support device 10 of this embodiment includes a requirement matching range-determination unit 28 that determines a requirement matching range, in which actual pixel density information matches the required pixel density information, in an imageable range of the surface to be imaged corresponding to the angle of view of the imaging device 200.

Figure 6:
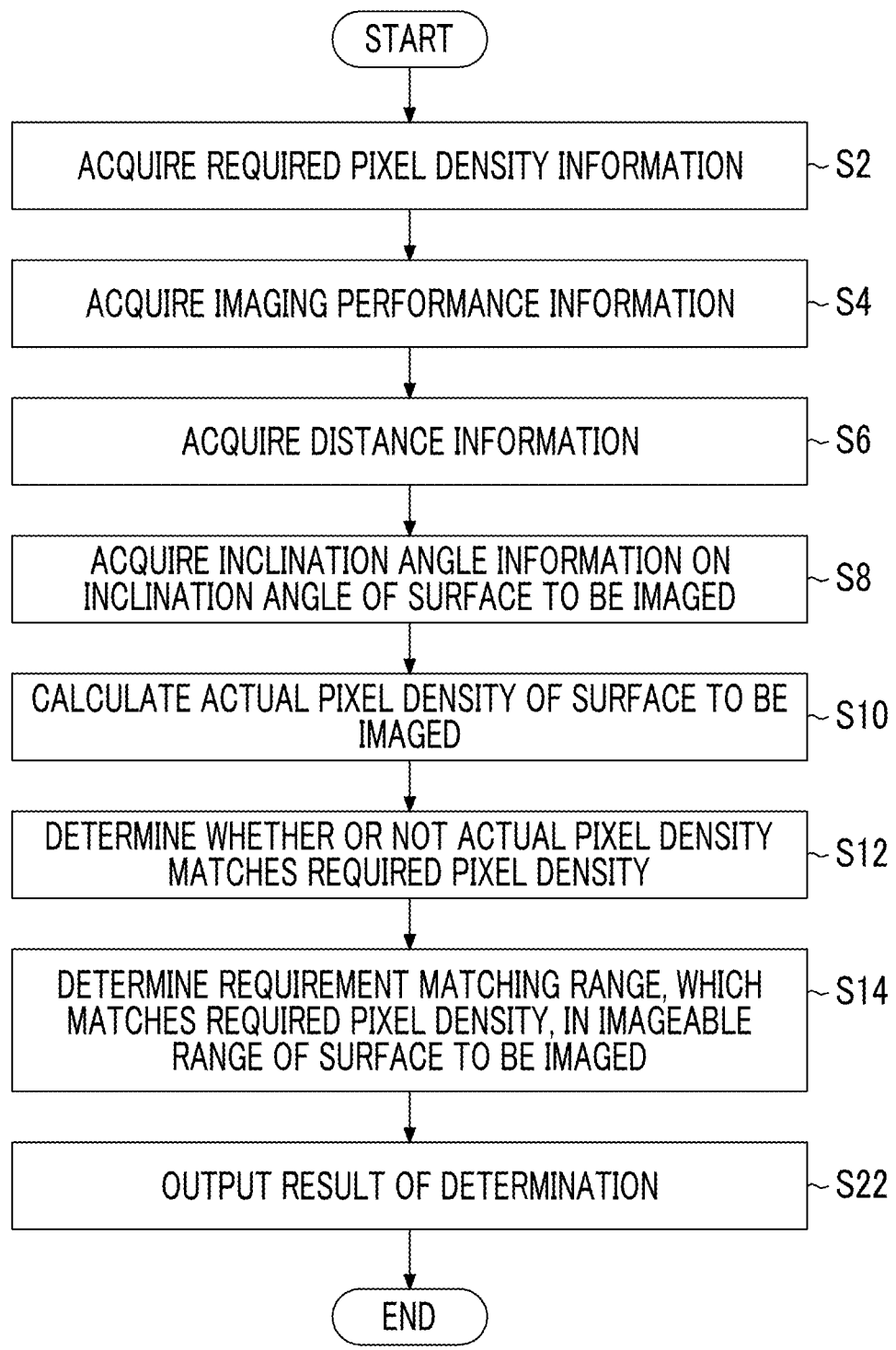
FIG. 6 is a flowchart showing the flow of an example of processing of an imaging support method according to the second embodiment.

FIG. 6 is a flowchart showing the flow of an example of imaging support processing of the second embodiment. This processing is performed according to a program stored in the storage unit 14. Since Steps S2 to S12 of FIG. 6 are the same as those of the example of imaging support processing of the first embodiment shown in FIG. 4, the description of Steps S2 to S12 of FIG. 6 will be omitted.

In Step S14, the requirement matching range-determination unit 28 that determines a requirement matching range, in which the actual pixel density matches the required pixel density information, in an imageable range of the surface to be imaged corresponding to the angle of view of the imaging device 200.

Figure 7:
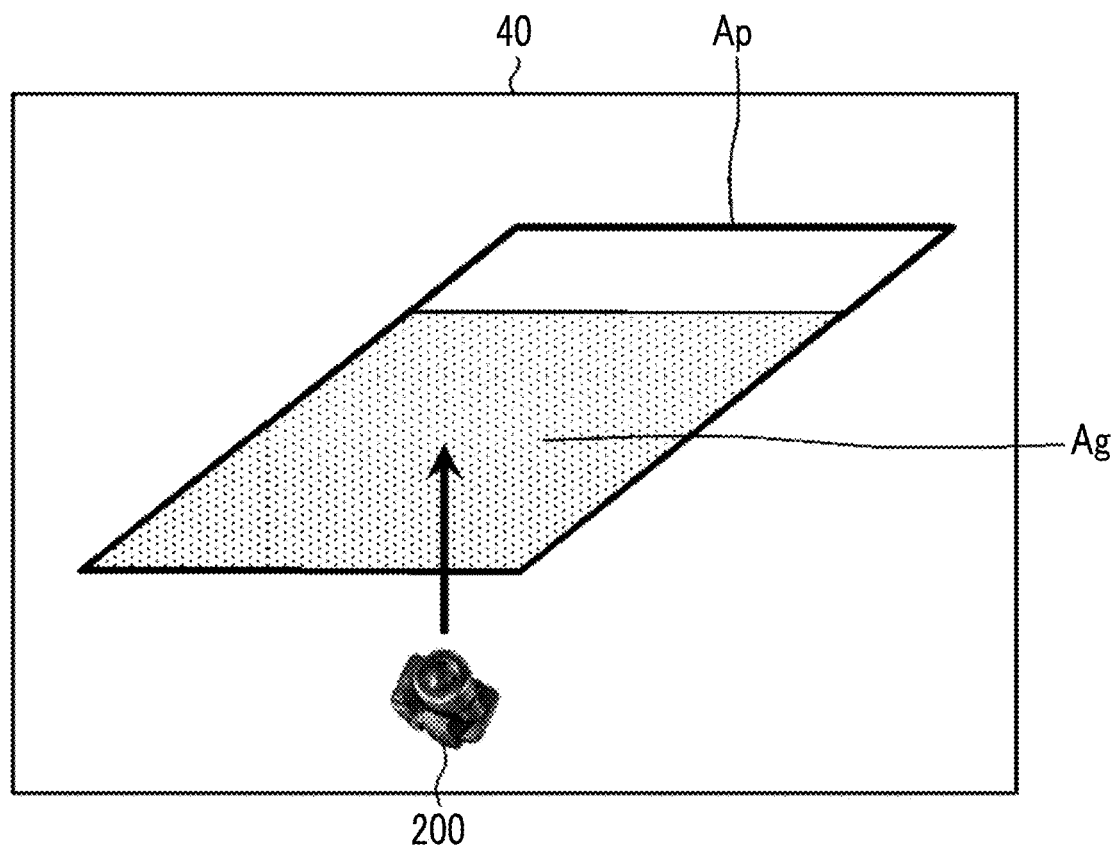
FIG. 7 is a diagram showing an example of display of a requirement matching range.

In Step S22, the result of the determination of the pixel density-determination unit 26 and the result of the determination of the requirement matching range-determination unit 28 are output by the output unit 40. FIG. 7 shows a frame that shows an imageable range Ap of the imaging device 200 on a display device as an example of the output unit 40, and shows an example in which a requirement matching range Ag is shown with dots. As shown in FIGS. 3 and 7, a requirement mismatching range is widened in the imageable range Ap as the inclination angle θ of the surface Sp to be imaged is increased. The invention is not particularly limited to a display example shown in FIG. 7. For example, information representing a requirement mismatching range may be displayed. The requirement matching range-determination unit 28 determines a requirement mismatching range, so that the requirement matching range is determined. The output unit 49 displays the requirement mismatching range, so that the requirement matching range is output.

Third Embodiment

Figure 8:
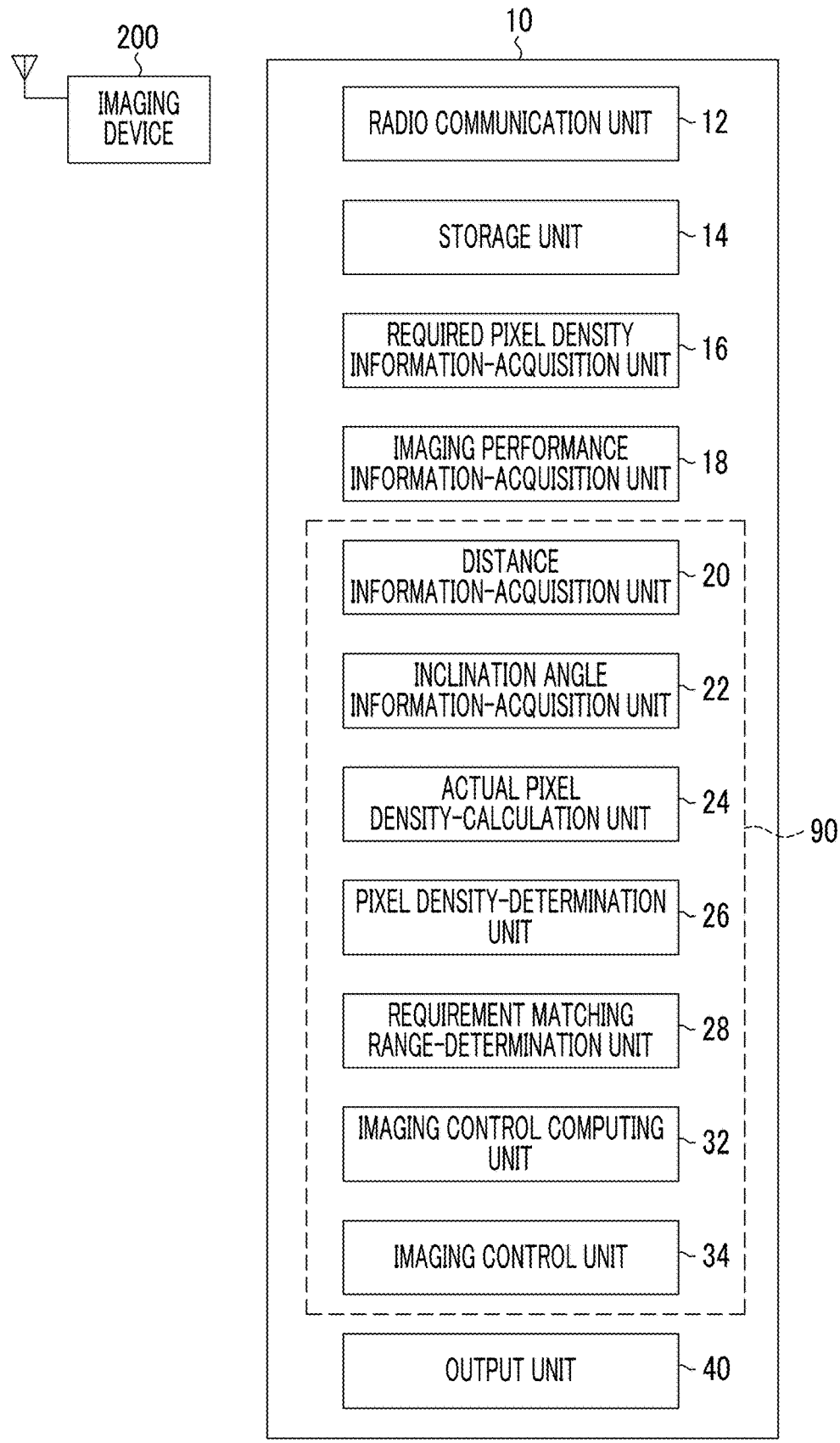
FIG. 8 is a block diagram showing an example of the configuration of an imaging support device according to a third embodiment.

FIG. 8 is a block diagram showing an example of the configuration of an imaging support device according to a third embodiment. The same components as the components of the imaging support device of the second embodiment shown in FIG. 5 are denoted in FIG. 8 by the same reference numerals as the reference numerals of the components of the imaging support device of the second embodiment shown in FIG. 5, and the description thereof will be omitted.

The imaging support device 10 of this embodiment includes: an imaging control computing unit 32 that computes an imaging position and an imaging direction of the imaging device 200, which allow the actual pixel density to match the required pixel density information, on the basis of the current imaging position and the current imaging direction of the imaging device 200 in a case where it is determined that the actual pixel density does not match the required pixel density information; and an imaging control unit 34 that controls the imaging position and the imaging direction of the imaging device 200 on the basis of the computation results of the imaging control computing unit 32.

Figure 9:
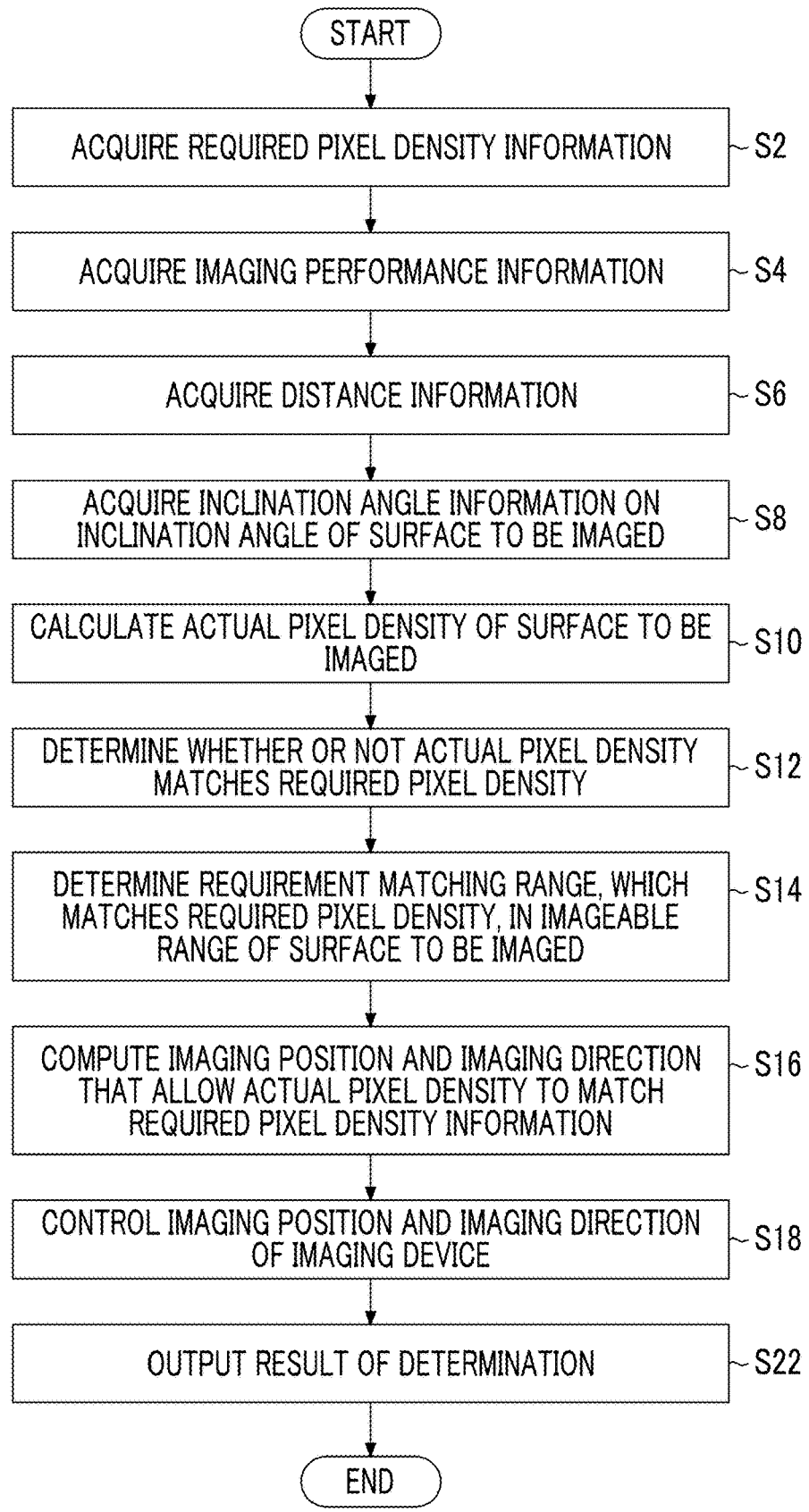
FIG. 9 is a flowchart showing the flow of an example of processing of an imaging support method according to the third embodiment.

FIG. 9 is a flowchart showing the flow of an example of imaging support processing of the third embodiment. This processing is performed according to a program stored in the storage unit 14. Since Steps S2 to S14 of FIG. 9 are the same as those of the example of imaging support processing of the second embodiment shown in FIG. 6, the description of Steps S2 to S14 of FIG. 9 will be omitted.

In Step S16, an imaging position and an imaging direction of the imaging device 200, which allow the actual pixel density to match the required pixel density information, are computed by the imaging control computing unit 32 on the basis of the current imaging position and the current imaging direction of the imaging device 200 in a case where it is determined that the actual pixel density does not match the required pixel density information.

In Step S18, the imaging position and the imaging direction of the imaging device 200 are controlled on the basis of the computation results of the imaging control computing unit 32 by the imaging control unit 34.

Fourth Embodiment

An example of an imaging support device, which is used to inspect a structure built as social infrastructure, will be described below <Example of Structure>

Figure 10:
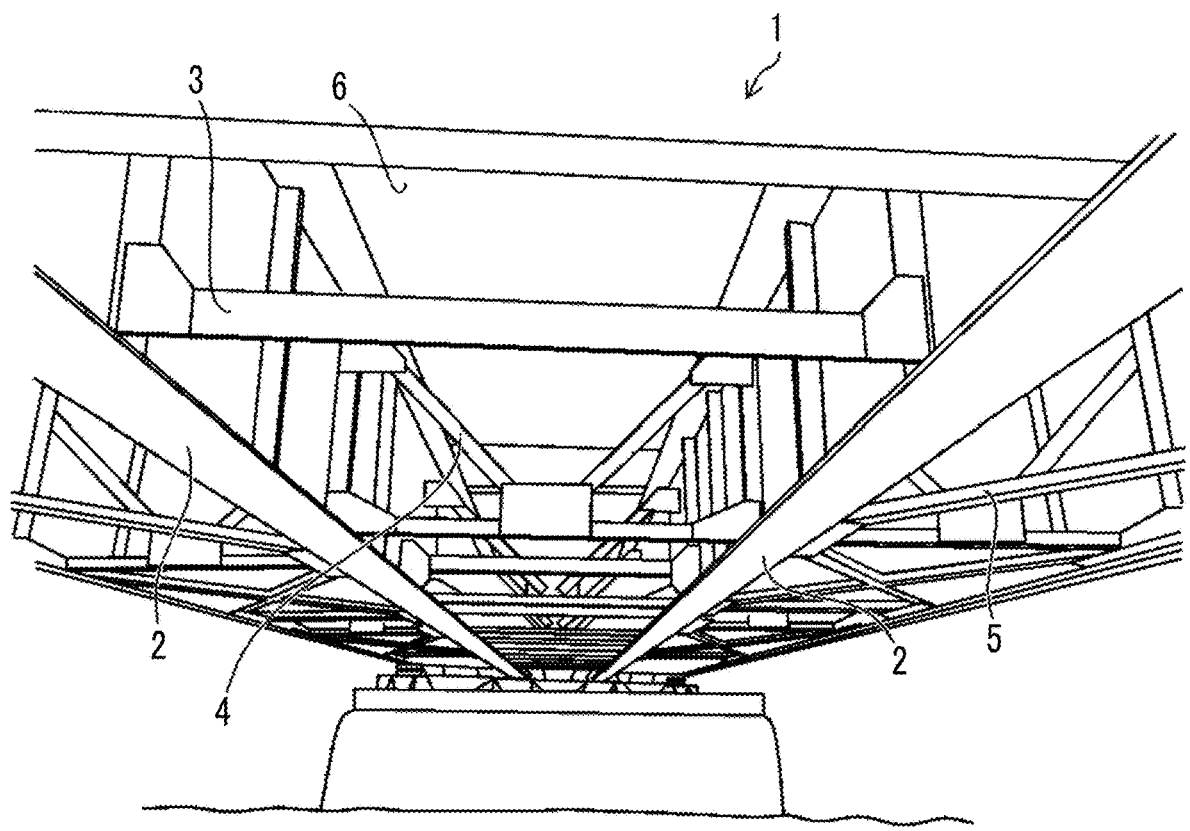
FIG. 10 is a diagram showing the appearance of a bridge that is an example of a structure.

FIG. 10 is a diagram showing the appearance of a bridge that is an example of a stricture, and is a perspective view of the bridge seen from below.

The bridge 1 shown in FIG. 10 includes main girders 2, cross beams 3, cross frames 4, and lateral frames and the main girders 2, the cross beams 3, the cross frames 4, and the lateral frames 5 are connected to each other by bolts, rivets, or welding. Further, deck slabs 6 on which vehicles and the like travel are installed on the main girders 2 and the like. The deck slab 6 is generally formed of a concrete member.

The main girder 2 is a member that is provided between abutments or piers and supports the load of vehicles and the like present on the deck slab 6. The cross beams 3 are members connecting the main girders 2 so that a load is supported by the plurality of main girders 2. The cross frame 4 and the lateral frame 5 are members that connect the main girders 2 to resist the lateral load of wind and earthquake.

The bridge 1 includes concrete members and steel members as members to be inspected. That is, the bridge 1 includes members in which cracks are generated as damage to be recognized and members in which crevices are generated as damage to be recognized. The invention can also be applied to a case in which a structure including only one of concrete members and steel members, that is, a structure including only one of members in which cracks are generated and members in which crevices are generated is imaged.

The "structure" of the invention is not limited to a bridge. For example, the "structure" of the invention may be a road, a tunnel, a dam, and a building. Further, the "structure" of the invention is not limited to an artificial structure and may be a natural structure.

<Example of Imaging Device and Example of Mounting of Imaging Device>

Figure 11:
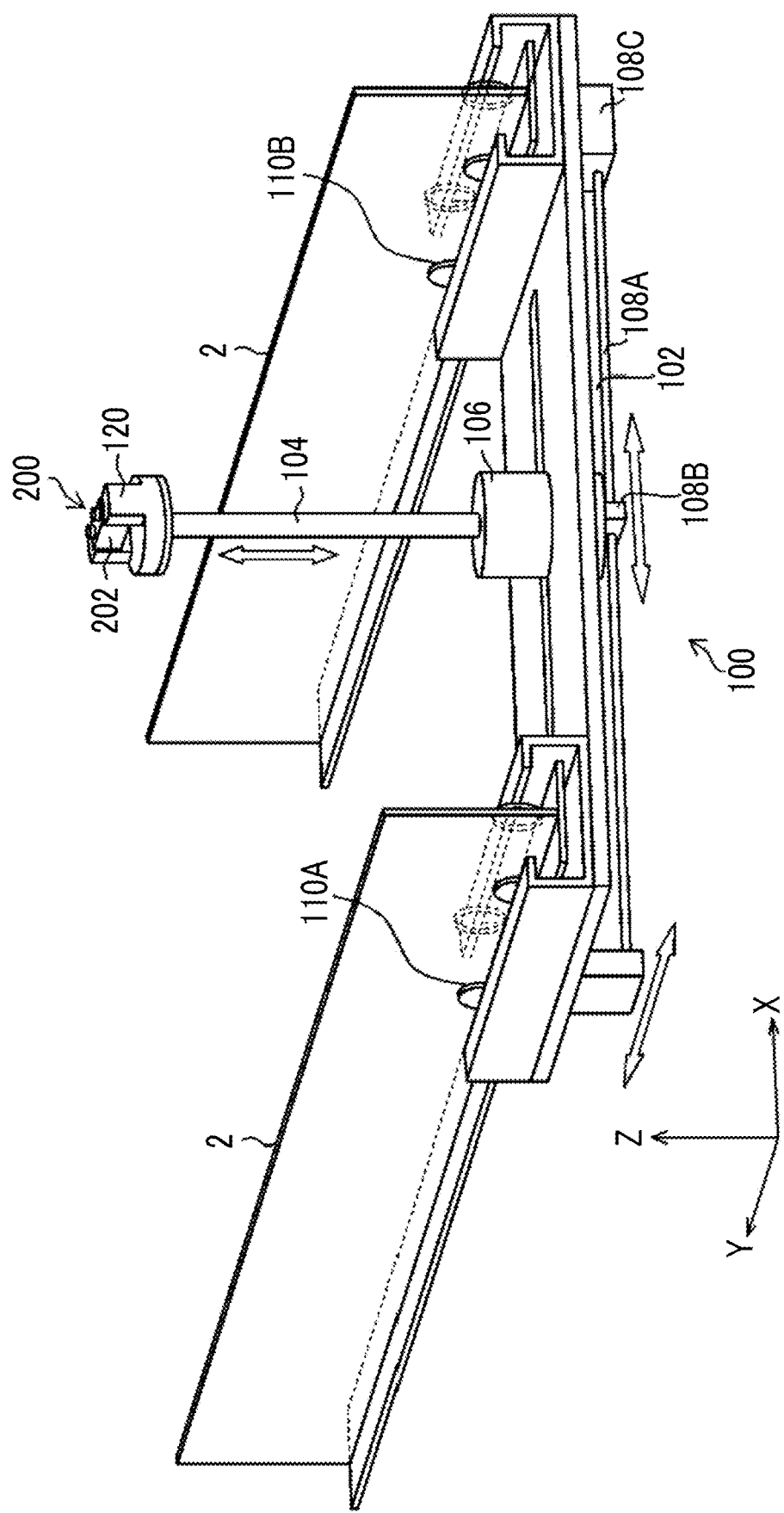
FIG. 11 is a perspective view showing the appearance of a robot apparatus including an imaging device.
Figure 12:
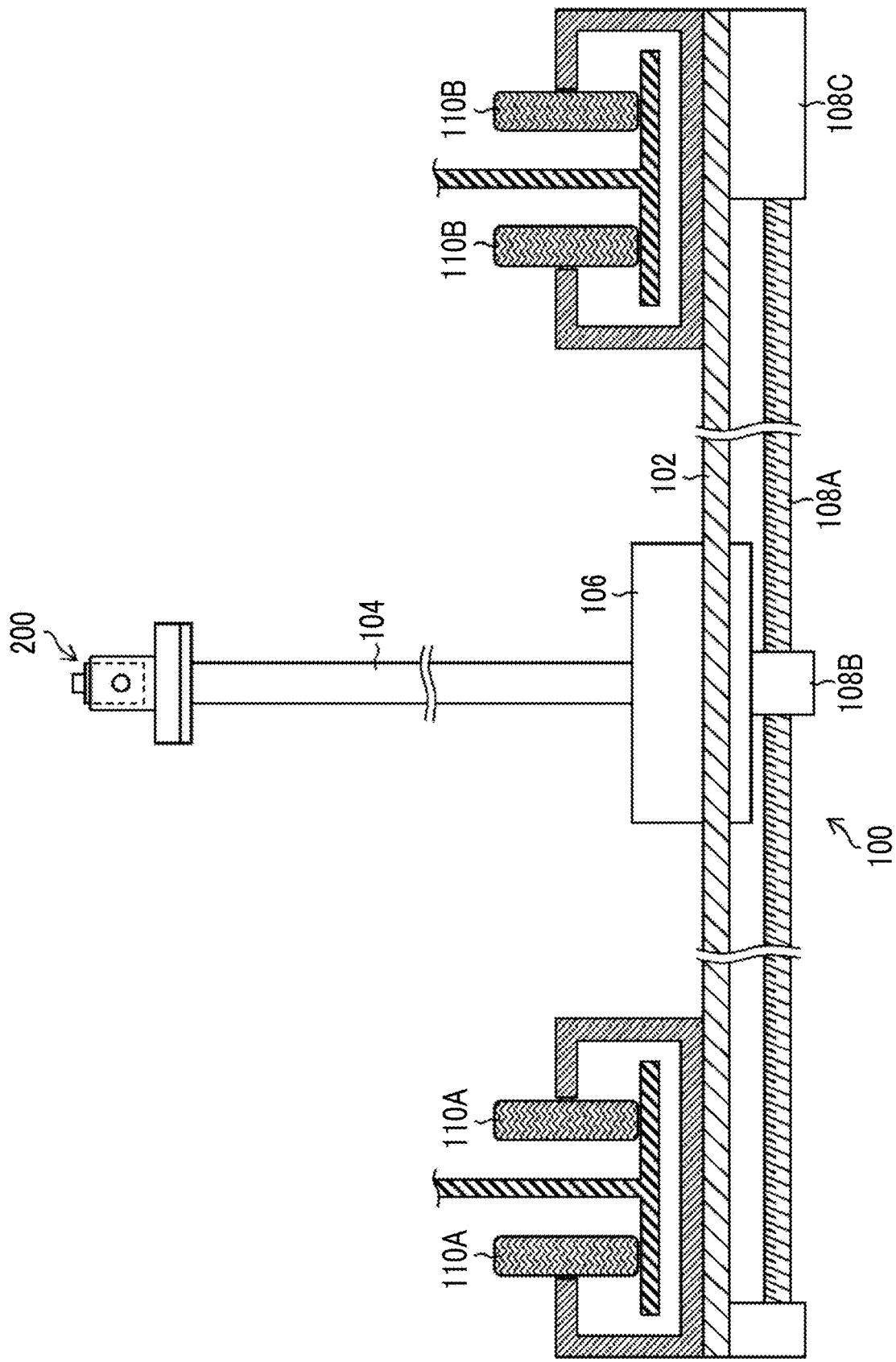
FIG. 12 is a cross-sectional view of main parts of the robot apparatus shown in FIG. 11.

FIG. 11 is a perspective view showing the appearance of a robot apparatus 100 including the imaging device 200, and shows a state in which the robot apparatus 100 is installed between the main girders 2 of the bridge 1. Further, FIG. 12 is a cross-sectional view of main parts of the robot apparatus 100 shown in FIG. 11.

The robot apparatus 100 includes the imaging device 200, and controls the position (which is an actual imaging position) of the imaging device 200 in a three-dimensional space and controls the imaging direction (which is an actual imaging direction) of the imaging device 200.

Although described in detail later, the robot apparatus 100 includes a main frame 102, a vertical telescopic arm 104, a housing 106 in which drive units, various control units, and the like for the vertical telescopic arm 104 are provided, an X-direction drive unit 108 (FIG. 14) that moves the housing 106 in a longitudinal direction of the main frame 102 (a direction orthogonal to the longitudinal direction of the main girder 2) (X direction), a Y-direction drive unit 110 (FIG. 14) that moves the entire robot apparatus 100 in the longitudinal direction of the main girder 2 (Y direction), and a Z-direction drive unit 112 (FIG. 14) that makes the vertical telescopic arm 104 elongate and contract in a vertical direction (Z direction).

The X-direction drive unit 108 includes a ball screw 108A that is provided in the longitudinal direction of the main frame 102 (X direction), a ball nut 108B that is provided in the housing 106, and a motor 108C that rotates the ball screw 108A; and rotates the ball screw 108A in a normal direction or a reverse direction by the motor 108C to move the housing 106 in the X direction.

The Y-direction drive unit 110 includes tires 110A and 110B that are provided at both ends of the main frame 102 and motors (not shown) that are provided in the tires 110A and 110B; and drives the tires 110A and 110B by the motors to move the entire robot apparatus 100 in the Y direction.

The robot apparatus 100 is installed in an aspect in which the tires 110A and 110B provided at both ends of the main frame 102 are placed on lower flanges of the two main girders 2 and are disposed so that the main girders 2 are positioned between the tires 110A and 110B. Accordingly, the robot apparatus 100 can move (be self-propelled) along the main girders 2 while being suspended from the lower flanges of the main girders 2. Further, although not shown, the main frame 102 is adapted so that the length of the main frame 102 can be adjusted in accordance with an interval between the main girders 2.

The vertical telescopic arm 104 is provided in the housing 106 of the robot apparatus 100, and is moved in the X direction and the Y direction together with the housing 106. Further, the vertical telescopic arm 104 is made to elongate and contract in the Z direction by the Z-direction drive unit 112 (FIG. 14) that is provided in the housing 106.

Figure 13:
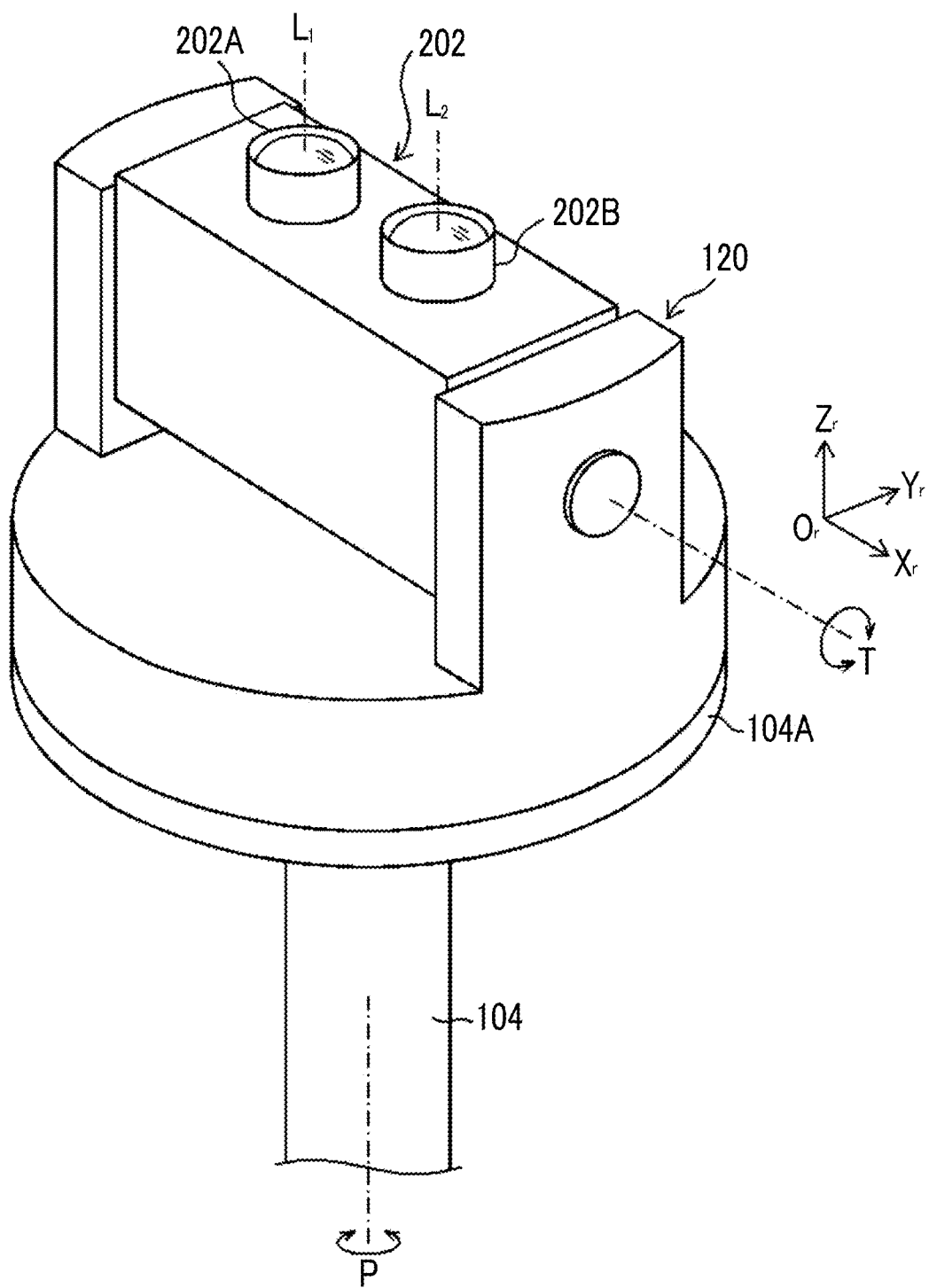
FIG. 13 is a perspective view showing the appearance of the imaging device and a pan/tilt mechanism.

A camera installation part 104A is provided at the distal end of the vertical telescopic arm 104 as shown in FIG. 13, and a twin-lens camera 202, which can be rotated in a pan direction and a tilt direction by a pan/tilt mechanism 120, is installed on the camera installation part 104A.

The twin-lens camera 202 includes a first imaging unit 202A and a second imaging unit 202B that take two parallax images (stereoscopic images) having different parallax; functions as a part of a first space information-acquisition unit that acquires first space information of the structure (bridge 1) corresponding to the imaging range of the twin-lens camera 202 in a local coordinate system (camera coordinate system) based on the twin-lens camera 202; and acquires at least one image of the two images, which are to be taken, as an "inspection image" to be attached to an inspection record.

Figure 14:
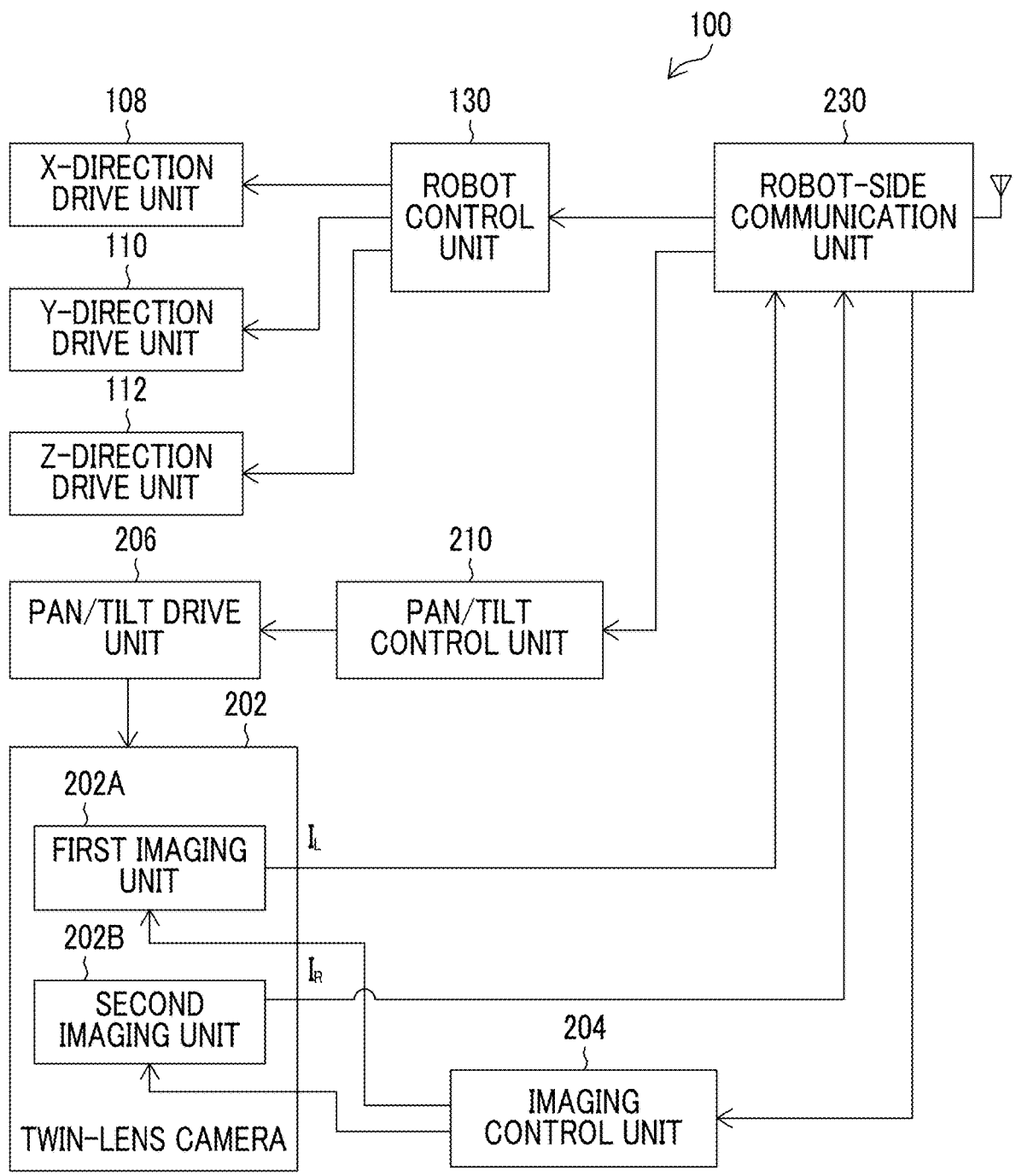
FIG. 14 is a block diagram of an example of the robot apparatus.

Further, the twin-lens camera 202 is rotated about a pan axis P coaxial with the vertical telescopic arm 104 or is rotated about a tilt axis T parallel to a horizontal direction by the pan/tilt mechanism 120 to which a driving force is applied from a pan/tilt drive unit 206 (FIG. 14). Accordingly, the twin-lens camera 202 can take images in any posture (take images in any imaging direction).

An optical axis $L_1$ of the first imaging unit 202A of the twin-lens camera 202 of this embodiment and an optical axis $L_2$ of the second imaging unit 202B are parallel to each other. Further, the pan axis P is orthogonal to the tilt axis T. Furthermore, the base length of the twin-lens camera 202 (that is, an installation interval between the first imaging unit 202A and the second imaging unit 202B) is already known.

Further, a camera coordinate system, which is based on the twin-lens camera 202, uses an intersection point between the pan axis P and the tilt axis T as an origin Or; and the direction of the tilt axis T is referred to as an X direction (Xr in FIG. 13), the direction of the pan axis P is referred to as a Z direction (Zr in FIG. 13), and a direction orthogonal to an X direction and a Z direction is referred to as a Y direction (Yr in FIG. 13).

The position (which is an "actual imaging position") of the twin-lens camera 202 can be detected using the moving distances of the robot apparatus 100 in the X direction and the Y direction and the moving distance of the vertical telescopic arm 104 in the Z direction with respect to the origin of a bridge coordinate system. Further, the imaging direction of the twin-lens camera 202 can be detected using the pan angle α and the tilt angle β of the pan/tilt mechanism or can be detected by a direction sensor (not shown) mounted on the twin-lens camera 202.

FIG. 14 is a block diagram of an example of the robot apparatus 100.

The robot apparatus 100 shown in FIG. 14 includes a robot control unit 130, the X-direction drive unit 108, the Y-direction drive unit 110, the Z-direction drive unit 112, the twin-lens camera 202 (imaging device 200), an imaging control unit 204, a pan/tilt control unit 210, a pan/tilt drive unit 206, and a robot-side communication unit 230.

The robot-side communication unit 230 performs two-way radio communication between the imaging support device 10 and itself; receives various commands, such as a movement command for controlling the movement of the robot apparatus 100, a pan/tilt command for controlling the pan/tilt mechanism 120, and an imaging command for controlling the twin-lens camera 202, which are transmitted from the imaging support device 10; and outputs the received commands to the corresponding control units, respectively.

The robot control unit 130 controls the X-direction drive unit 108, the Y-direction drive unit 110, and the Z-direction drive unit 112 on the basis of a movement command, which is input from the robot-side communication unit 230, to make the robot apparatus 100 move in the X direction and the Y direction and to make the vertical telescopic arm 104 elongate and contract in the Z direction (see FIG. 11).

The pan/tilt control unit 210 makes the pan/tilt mechanism 120 be operated in the pan direction and the tilt direction by the pan/tilt drive unit 206 on the basis of a pan/tilt command, which is input from the robot-side communication unit 230, to pan and tilt the twin-lens camera 202 in a desired direction (see FIG. 13).

The imaging control unit 204 makes the first and second imaging units 202A and 202B of the twin-lens camera 202 take live-view images or inspection images on the basis of an imaging command that is input from the robot-side communication unit 230.

Image data that represents a first image $I_L$ and a second image $I_R$ taken by the first and second imaging units 202A and 202B of the twin-lens camera 202 during the inspection of the bridge 1 and having different parallax, and information that represents the actual imaging position (the position of the origin Or of the camera coordinate system in the bridge coordinate system) and the actual imaging direction (in this embodiment, the pan angle α and the tilt angle β) of the twin-lens camera 202 are transmitted to the imaging support device 10 through the robot-side communication unit 230.

The "imaging device" of the invention is not limited to a digital camera mounted on the robot apparatus. The "imaging device" of the invention may be, for example, a digital camera mounted on a drone (flying device) and a digital camera carried by a person.

Further, the "image" of the invention is not limited to a still image. The "image" of the invention may be a moving image.

The imaging device 200 includes the imaging element and the imaging lens.

[Imaging Support System]

Figure 15:
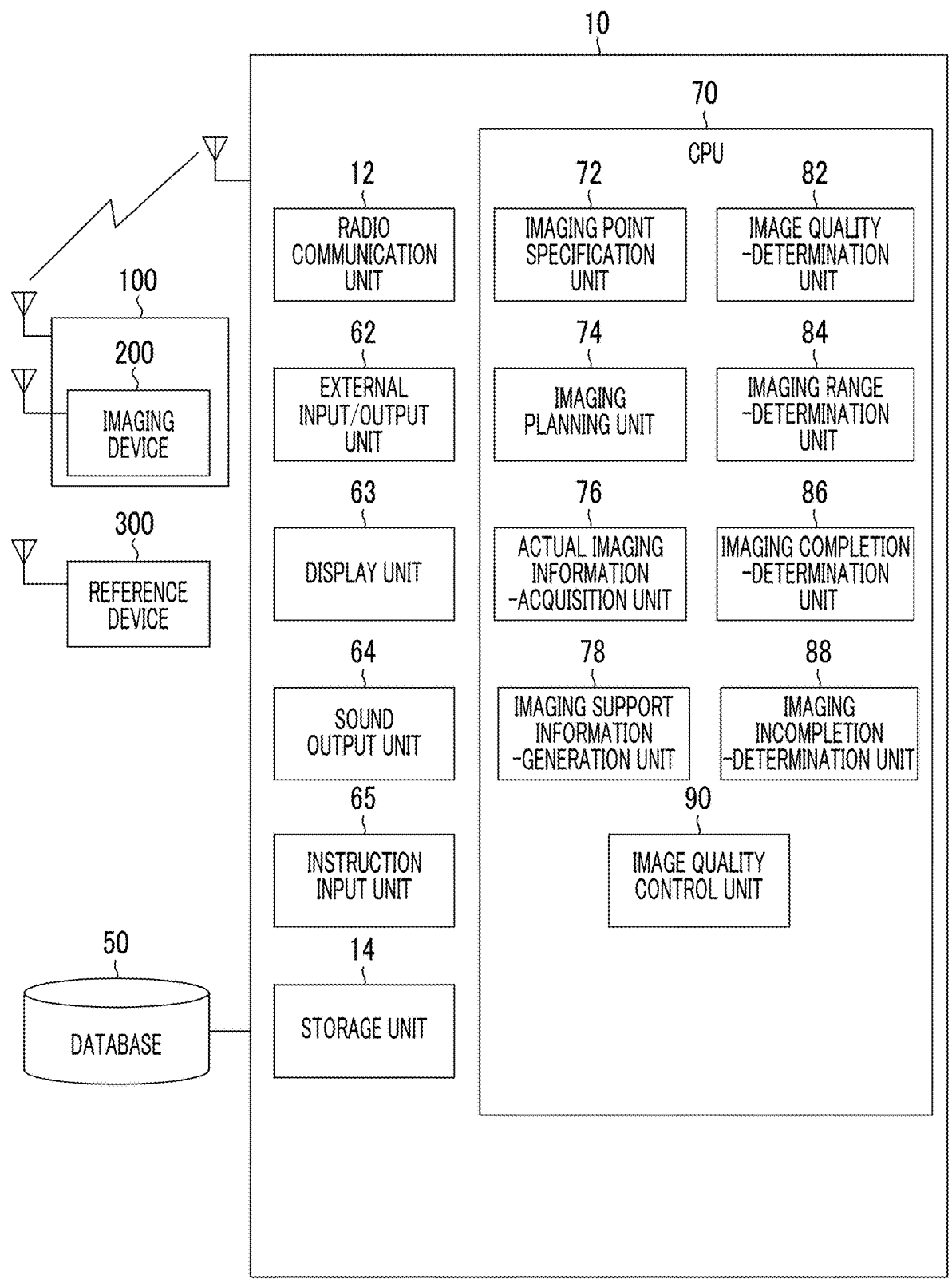
FIG. 15 is a block diagram showing an example of an imaging support system using an imaging support device of a fourth embodiment.

FIG. 15 is a block diagram showing an example of an imaging support system using the imaging support device of the invention. A case in which the imaging support device 10 of the FIG. 15 is applied as a terminal device for controlling the robot apparatus 100 shown in FIGS. 11 to 14 will be described in this embodiment.

The imaging support device 10 of this embodiment includes an external input/output unit 62 that inputs and outputs various types of information to and from a database 50, a display unit 63 (which is one form of an "output unit") that displays information to a user, a sound output unit 64 that outputs sound to the user, an instruction input unit 65 that receives an instruction input from the user, and a central processing unit (CPU) 70 that controls the respective units of the imaging support device 10 according to a program stored in the storage unit 14.

The radio communication unit 12 of this embodiment can perform radio communication between the robot apparatus 100 and a reference device 300.

The external input/output unit 62 includes a device that can communicate with the database 50 through a network. A device, which inputs and outputs information to and from an external storage device, such as a memory card, of the imaging support device 10, may be used as the external input/output unit 62.

The external input/output unit 62 of this embodiment acquires drawing information of a structure from the database 50. That is, the external input/output unit 62 of this embodiment is one form of a "drawing information-acquisition unit".

The drawing information is, for example, CAD (computer aided design) drawing data. The drawing information may be non-CAD drawing data that is not created with CAD.

The display unit 63 is formed of, for example, a liquid crystal display (LCD). Other display devices, such as an organic electroluminescent display, may be used as the display unit 63.

The sound output unit 64 is formed of, for example, a speaker.

The instruction input unit 65 is formed of, for example, a touch panel. The instruction input unit 65 may be formed of a keyboard and a mouse. Other input devices may be used as the instruction input unit 65. For example, a voice input device may be used as the instruction input unit 65.

The CPU 70 of this embodiment includes: an imaging point specification unit 72 that specifies an imaging point of the structure on the basis of at least the drawing information; an imaging planning unit 74 that determines a scheduled imaging position of the imaging device 200 at each imaging of the structure and a scheduled imaging direction of the imaging device 200 at each imaging of the structure on the basis of at least the specified imaging point and generates imaging plan information representing the scheduled imaging position at each imaging and the scheduled imaging direction at each imaging; an actual imaging information-acquisition unit 76 that acquires actual imaging position information of the imaging device 200 at each imaging of the structure and actual imaging direction information of the imaging device 200 at each imaging of the structure; an imaging support information-generation unit 78 that generates imaging support information for combining the imaging plan information with the drawing information and allowing the display unit 63 to display the combined information; an image quality-determination unit 82 that determines whether or not the actual image quality of a taken image obtained by the imaging device 200 matches required image quality; an imaging range-determination unit 84 that determines whether or not an imaging range is appropriate; an imaging completion-determination unit 86 that determines whether or not the imaging of the imaging point of the structure is completed; an imaging incompletion-determination unit 88 that determines whether or not the incomplete imaging of the imaging point of the structure is present and a user has a mind to complete imaging; and an image quality control unit 90 that controls the image quality of the taken image.

The image quality control unit 90 includes the respective units, which are denoted by reference numerals 20 to 34, (the distance information-acquisition unit 20, the inclination angle information-acquisition unit 22, the actual pixel density-calculation unit 24, the pixel density-determination unit 26, the requirement matching range-determination unit 28, the imaging control computing unit 32, and the imaging control unit 34) of the imaging support device 10 of the third embodiment shown in FIG. 8. The image quality-determination unit 82 of this embodiment determines image quality using the actual pixel density-calculation unit 24, the pixel density-determination unit 26, and the requirement matching range-determination unit 28 of the image quality control unit 90.

Figure 16:
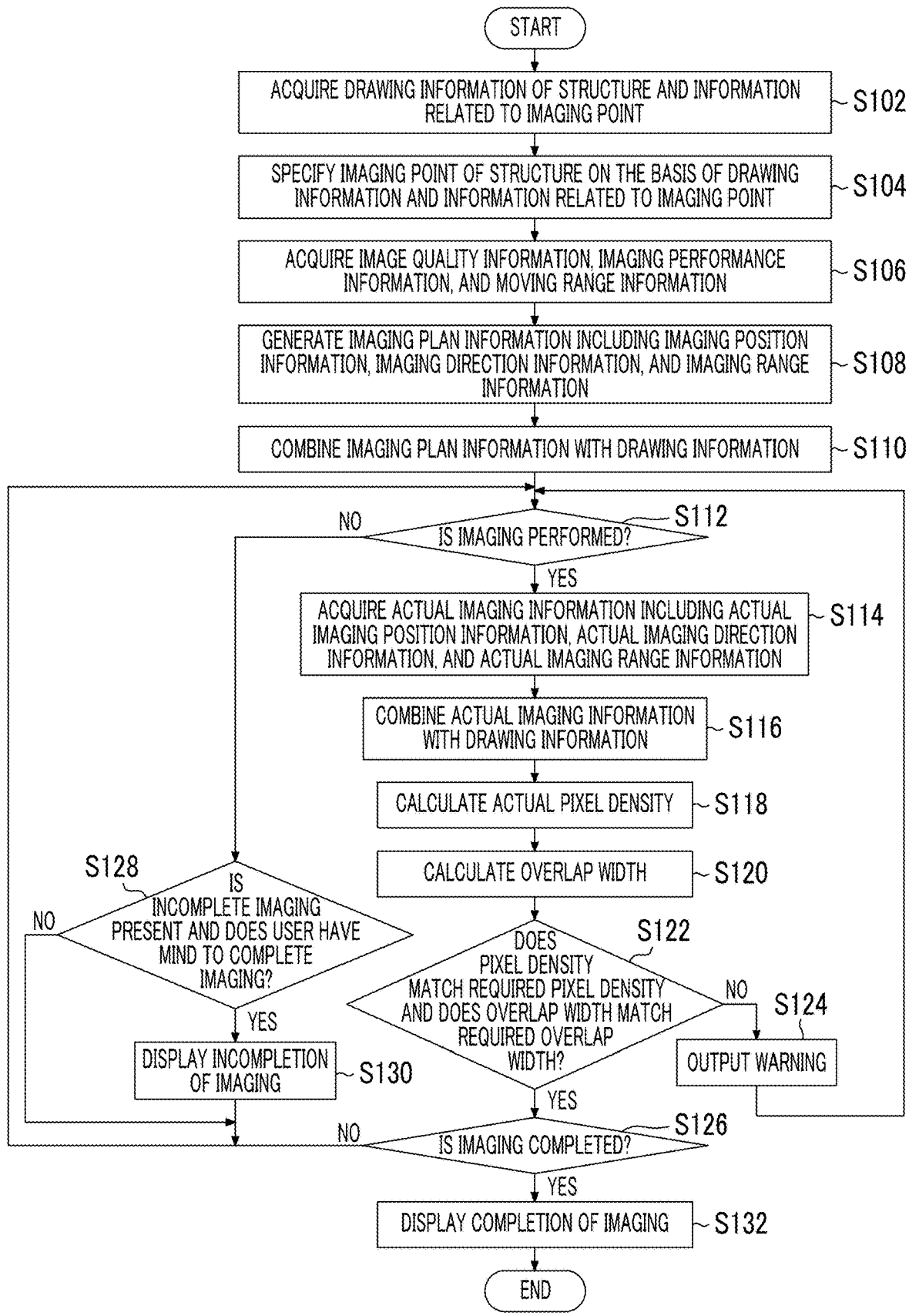
FIG. 16 is a flowchart showing the flow of an example of imaging support processing of the imaging support device of FIG. 15.

FIG. 16 is a flowchart showing the flow of an example of imaging support processing of the imaging support device of FIG. 15. This processing is performed by the CPU 70 according to a program stored in the storage unit 14. A case in which the bridge 1 of FIG. 10 is imaged as a structure to be inspected will be described below by way of example.

First, the drawing information of the structure and information related to the imaging point of the structure are acquired from the database 50 by the external input/output unit 62 (Step S102). In this embodiment, the CAD drawing data of the bridge 1 is acquired as the drawing information.

Next, the imaging point of the structure is specified on the basis of the drawing information and the information related to the imaging point by the imaging point specification unit 72 (Step S104). In this embodiment, to inspect the deck slab 6 of the bridge 1 formed of a concrete member, the entire exposed surface of the deck slab 6 is specified as the imaging point.

Next, image quality information required for the taken image, the imaging performance information of the imaging device 200, and moving range information representing a range where the imaging device 200 can be moved or a range where the imaging device 200 cannot be moved are acquired from the database 50 by the external input/output unit 62 (Step S106). Image quality information corresponding to the width of "crack", which requires the highest image quality, of damage to the deck slab 6 made of concrete is acquired in this embodiment. In this embodiment, the pixel density of the taken image required for the exposed surface (which is the surface to be imaged) of the deck slab 6 (required pixel density) is acquired as the image quality information. Further, an overlap width required for the taken image (hereinafter, referred to as a "required overlap width") is acquired in this embodiment. The required overlap width is the width of an overlapping portion between one taken image and another taken image adjacent to the taken image. In other words, the required overlap width is the width of an overlapping portion between adjacent imaging ranges.

Next, the imaging plan information, which includes the imaging position information and the imaging direction information of the imaging device 200 at each imaging and the imaging range information of the structure, is generated by the imaging planning unit 74 on the basis of the imaging point that is specified in Step S104 and the image quality information, the imaging performance information, and the moving range information that are acquired in Step S106 (Step S108). The imaging plan information is stored in the storage unit 14.

The imaging support device 10 can communicate with the robot apparatus 100, the imaging device 200, and the reference device 300 by radio in an inspection site. The imaging support device 10 may have access to the database 50 in the inspection site, but does not need to have access to the database 50 in a case in which information required for Steps S110 to S132 (for example, the drawing information and the imaging plan information) is stored in the storage unit 14 in advance before Step S110.

First, the imaging support information-generation unit 78 combines the imaging plan information with the drawing information and allows the display unit 63 to display the combined information (Step S110). For example, in a case in which the deck slab 6 is imaged in panel and one panel is split into twelve pieces and each of the twelve pieces is imaged, the imaging support information-generation unit 78 combines the imaging position information and the imaging range information with the drawing information at each of a total of twelve times of split imaging.

Next, the imaging control unit 34 of the image quality control unit 90 determines whether or not one time of imaging is performed by the imaging device 200 (Step S112).

Then, the actual imaging position information, the actual imaging direction information, and actual imaging range information of the imaging device 200 are acquired by the actual imaging information-acquisition unit 76 (Step S114).

In this embodiment, the current position of the imaging device 200 is measured by the reference device 300 (for example, a total station) of which the absolute position is known. For example, in a case in which the deck slab 6 is imaged by the imaging device 200, the imaging device 200 transmits the taken image to the imaging support device 10 through radio communication. The imaging support device 10 makes the image, which is received from the imaging device 200 through radio communication, and the actual imaging position information, which is received from the reference device 300 through radio communication, be associated with each other and stores the image and the actual imaging position information in the storage unit 14. The imaging support device 10 may record the image and the actual imaging position information in an external device (not shown) instead of storing the image and the actual imaging position information in the storage unit 14. Further, an imaging instruction and the actual imaging position information (which is information received from the reference device 300 through radio communication) are transmitted to the imaging device 200 from the imaging support device 10 through radio communication, and an image and the actual imaging position information may be stored in association with each other by the imaging device 200. The reference device 300 measures the reference position of the deck slab 6 of the bridge 1, and can calculate the actual imaging position information of which the origin is the reference position of the deck slab 6.

The actual imaging information-acquisition unit 76 can acquire the actual imaging range information on the basis of the actual imaging position information and the actual imaging direction information. In a case in which the imaging direction of the imaging device 200 is constant, the actual imaging information-acquisition unit 76 can acquire the actual imaging range information while using only the actual imaging position information as a parameter.

Next, required information of the information acquired in Step S114 (actual imaging information including the actual imaging position information, the actual imaging direction information, and the actual imaging range information) is combined with the drawing information by the imaging support information-generation unit 78 (Step S116).

Then, the actual pixel density of the taken image is calculated by the actual pixel density-calculation unit 24 of the image quality control unit 90 (Step S118), and the imaging range-determination unit 84 calculates the overlap width of an actual imaging range (Step S120) and determines whether or not the actual pixel density matches the required pixel density and the overlap width of the taken image matches the required overlap width (Step S122).

If it is determined that the pixel density of the taken image does not match the required pixel density or the overlap width of the taken image does not match the required overlap width (if the result of the determination in Step S122 is "NO"), warning information is output to the display unit 63 (Step S124) and processing returns to Step S112. That is, the display unit 63 is allowed to display warning information and prompts a user to take an image again.

If it is determined that the pixel density of the taken image matches the required pixel density and the overlap width of the taken image matches the required overlap width (If the result of the determination in Step S122 is "YES"), the imaging completion-determination unit 86 determines whether or not all of a plurality of times of imaging of the imaging point end (Step S126). If it is determined that the imaging is completed (If the result of the determination in Step S126 is "YES"), the completion of the imaging is displayed (Step S132) and this processing ends.

If the result of the determination in Step S112 is "NO", the imaging incompletion-determination unit 88 determines whether or not the incomplete imaging of the imaging point is present and a user has a mind to complete imaging (Step S128). If it is determined that the imaging is not completed and a user has a mind to complete imaging (If the result of the determination in Step S128 is "YES"), the incompletion of the imaging is displayed (Step S130).

In this embodiment, in a case in which an imaging range, which is not yet imaged, is present at the imaging point (in this embodiment, the entire exposed surface of the deck slab 6 of the bridge 1) and a distance between the imaging position of the incomplete imaging and the imaging device 200 exceeds a threshold value, the display unit 63 is allowed to display imaging incompletion information.

In a case in which an imaging range, which is not yet imaged, is present at the imaging point and an instruction to stop the imaging support device 10 is input to the instruction input unit 65, the display unit 63 may be allowed to display imaging incompletion information. In a case in which a stop instruction is input to the imaging device 200 in a state in which the imaging is incomplete, the display unit 63 may be allowed to display an imaging incompletion display.

The embodiments of the invention have been described above, but the invention is not limited to the above-mentioned embodiments and the above-mentioned modification examples and can have various modifications without departing from the scope of the invention.

EXPLANATION OF REFERENCES

1: bridge
2: main girder
3: cross beam
4: cross frame
5: lateral frame
6: deck slab
10: imaging support device
12: radio communication unit
14: storage unit
16: required pixel density information-acquisition unit
18: imaging performance information-acquisition unit
20: distance information-acquisition unit
22: inclination angle information-acquisition unit
24: actual pixel density-calculation unit
26: pixel density-determination unit
28: requirement matching range-determination unit
32: imaging control computing unit
34: imaging control unit
40: output unit
50: database
62: external input/output unit 63: display unit
64: sound output unit
65: instruction input unit
70: CPU
72: imaging point specification unit
74: imaging planning unit
76: actual imaging information-acquisition unit
78: imaging support information-generation unit
82: image quality-determination unit
84: imaging range-determination unit
86: imaging completion-determination unit
88: imaging incompletion-determination unit
90: image quality control unit
100: robot apparatus
102: main frame
104: vertical telescopic arm
104A: camera installation part
106: housing
108: X-direction drive unit
108A: ball screw
108B: ball nut
108C: motor
110: Y-direction drive unit
110A: tire
110B: tire
112: Z-direction drive unit
120: pan/tilt mechanism
130: robot control unit
200: imaging device
202: twin-lens camera.
202A: first imaging unit
202B: second imaging unit
204: imaging control unit
206: pan/tilt drive unit
210: pan/tilt control unit
230: robot-side communication unit
300: reference device
Ag: requirement matching range
Ap: imageable range
Dv: imaging direction
L: imaging distance
P: pan axis
Sp: surface to be imaged
T: tilt axis
φ: angle of view
θ: inclination angle

What is claimed is:

1. An imaging support device that supports imaging of a structure performed using an imaging device, the imaging support device comprising:
   a required pixel density information-acquisition circuit that acquires required pixel density information of a surface to be imaged of the structure required for recognition of a damage state of the structure;
   an imaging performance information-acquisition circuit that acquires imaging performance information of the imaging device including information on the number of pixels of an imaging element of the imaging device, size information of the imaging element of the imaging device, and information on a focal length of an imaging lens of the imaging device;
   a distance information-acquisition circuit that acquires distance information on a distance between the imaging device and the surface to be imaged of the structure;
   an inclination angle information-acquisition circuit that acquires inclination angle information on an inclination angle of the surface to be imaged of the structure with respect to a direction orthogonal to an imaging direction of the imaging device;
   an actual pixel density-calculation circuit that calculates actual pixel density of the surface to be imaged of the structure on the basis of the acquired imaging performance information, the acquired distance information, and the acquired inclination angle information; and
   a pixel density-determination circuit that determines whether or not the calculated actual pixel density matches the required pixel density information.

2. The imaging support device according to claim 1, wherein the actual pixel density-calculation circuit calculates the actual pixel density, which is to be obtained in a case in which the inclination angle information is an angle θ larger than 0°, by multiplying the actual pixel density, which is to be obtained in a case in which the inclination angle information is 0°, and cos θ together.

3. The imaging support device according to claim 1, further comprising:
   a requirement matching range-determination circuit that determines a requirement matching range, in which the actual pixel density matches the required pixel density information, in an imageable range of the surface to be imaged of the structure corresponding to an angle of view of the imaging device.

4. The imaging support device according to claim 1, wherein the required pixel density information-acquisition circuit acquires the required pixel density information on the basis of at least one of the type of a member of the structure or the type of damage to the structure.

5. The imaging support device according to claim 1, further comprising:
   an output circuit that outputs results of the determination.

6. The imaging support device according to claim 5, wherein the output circuit outputs information prompting the imaging device to move in a case where it is determined that the actual pixel density does not match the required pixel density information.

7. The imaging support device according to claim 1, further comprising:
   an imaging control computing circuit that computes an imaging position and an imaging direction of the imaging device, which allow the actual pixel density to match the required pixel density information, on the basis of a current imaging position and a current imaging direction of the imaging device in a case where it is determined that the actual pixel density does not match the required pixel density information; and
   an imaging control circuit that controls the imaging position and the imaging direction of the imaging device on the basis of computation results of the imaging control computing circuit.

8. The imaging support device according to claim 1, wherein before a plurality of times of imaging of the structure is performed, the pixel density-determination circuit determines whether or not the actual pixel density satisfies the required pixel density information over the plurality of times of imaging while using pixel density, which is obtained from the surface to be imaged of the structure at each imaging of the structure, as the actual pixel density.

9. The imaging support device according to claim 1, wherein the pixel density-determination circuit switches the required pixel density information, which is to be compared with the actual pixel density, according to the type of the imaging device or the type of an apparatus on which the imaging device is mounted.

10. The imaging support device according to claim 9, further comprising:
a drawing information-acquisition circuit that acquires drawing information of the structure;
an imaging point specification circuit that specifies an imaging point of the structure on the basis of the acquired drawing information; and
an imaging planning circuit that determines an imaging position and an imaging direction of each imaging of the structure on the basis of the specified imaging point of the structure, and generates imaging plan information representing the imaging position and the imaging direction of each imaging of the structure.

11. The imaging support device according to claim 1, wherein the structure includes at least one of a concrete member or a steel member as a member to be inspected.

12. The imaging support device according to claim 1, wherein the structure includes a member in which at least one of a crack or a crevice is generated as damage to be recognized.

13. An imaging support method that supports imaging of a structure performed using an imaging device, the imaging support device comprising:
acquiring required pixel density information of a surface to be imaged of the structure required for recognition of a damage state of the structure;
acquiring imaging performance information of the imaging device including information on the number of pixels of an imaging element of the imaging device, size information of the imaging element of the imaging device, and information on a focal length of an imaging lens of the imaging device;
acquiring distance information on a distance between the imaging device and the surface to be imaged of the structure;
acquiring inclination angle information on an inclination angle of the surface to be imaged of the structure with respect to a direction orthogonal to an imaging direction of the imaging device;
calculating actual pixel density of the surface to be imaged of the structure on the basis of the acquired imaging performance information, the acquired distance information, and the acquired inclination angle information; and
determining whether or not the calculated actual pixel density matches the required pixel density information.

* * * * *